US010088301B2

(12) United States Patent
Naruse et al.

(10) Patent No.: US 10,088,301 B2
(45) Date of Patent: Oct. 2, 2018

(54) IMAGE MEASUREMENT DEVICE

(71) Applicant: Keyence Corporation, Osaka (JP)

(72) Inventors: Takashi Naruse, Osaka (JP); Koji Takahashi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/620,844

(22) Filed: Jun. 13, 2017

(65) Prior Publication Data

US 2018/0003485 A1 Jan. 4, 2018

(30) Foreign Application Priority Data

Jul. 4, 2016 (JP) ................................ 2016-132920

(51) Int. Cl.

| | |
|---|---|
| ***G06T 7/00*** | (2017.01) |
| ***G01B 11/25*** | (2006.01) |
| ***G06T 7/13*** | (2017.01) |
| ***G06T 7/70*** | (2017.01) |
| ***G06K 9/46*** | (2006.01) |

(Continued)

(52) U.S. Cl.

CPC .............. *G01B 11/25* (2013.01); *G01B 21/04* (2013.01); *G05B 19/00* (2013.01); *G06K 9/4604* (2013.01); *G06K 9/6202* (2013.01); *G06T 7/0004* (2013.01); *G06T 7/13* (2017.01); *G06T 7/70* (2017.01); *G06T 2200/24* (2013.01); *G06T 2207/30164* (2013.01)

(58) Field of Classification Search

CPC ...... G01B 11/25; G01B 21/04; G06K 9/4604; G06K 9/6202; G06T 7/13; G06T 7/0004; G06T 7/70; G06T 2207/30164; G06T 2200/24; G05B 19/00

See application file for complete search history.

(56) References Cited

U.S. PATENT DOCUMENTS 7,738,121 B2 * 6/2010 Spalding .............. G01B 11/245 250/559.24
7,796,278 B2 * 9/2010 Spalding ............ G01B 11/2425 250/208.1

(Continued)

OTHER PUBLICATIONS

Ji et al., "An Opto-mechanical Microprobe System for Measuring Very Small Parts on CMMs," SPIE vol. 3454, Jul. 20-22, 1998, pp. 348-353.

*Primary Examiner* — Ping Hsieh
(74) *Attorney, Agent, or Firm* — Kilyk & Bowersox, P.L.L.C.

(57) ABSTRACT

There are included a display section for displaying a model image, an input receiving section for receiving designation, in the model image, of a measurement element for which measurement is to be performed by the probe, a storage section storing, in advance, an arrangement rule defining a relationship between a shape type or a size of a measurement element and arranged positions of contact target positions of the probe, and a measurement control section for identifying, at a time of measurement execution, contact target positions of the probe based on a position of the measurement element designated by the input receiving section, a shape type or a size of the measurement element, and the arrangement rule that is stored in the storage section, and for controlling a horizontal drive section so that the probe sequentially moves to the plurality of contact target positions identified.

15 Claims, 33 Drawing Sheets

IMAGE MEASUREMENT DEVICE 1

(51) Int. Cl.
*G06K 9/62* (2006.01)
*G01B 21/04* (2006.01)
*G05B 19/00* (2006.01)

(56) References Cited

U.S. PATENT DOCUMENTS

2010/0201806 A1* 8/2010 Nygaard ............ G01B 11/2425
348/92
2010/0245850 A1* 9/2010 Lee ......................... F42B 35/02
356/625
2012/0027289 A1* 2/2012 Naruse .................... G06T 7/001
382/152
2015/0285629 A1* 10/2015 Ould ...................... G01B 21/04
33/503
2016/0307322 A1* 10/2016 Engel ..................... G01B 11/25
2017/0276651 A1* 9/2017 Hall ....................... G01B 17/02
2018/0003487 A1 1/2018 Takahashi et al.

* cited by examiner

FIG. 2A MEASUREMENT POSITION
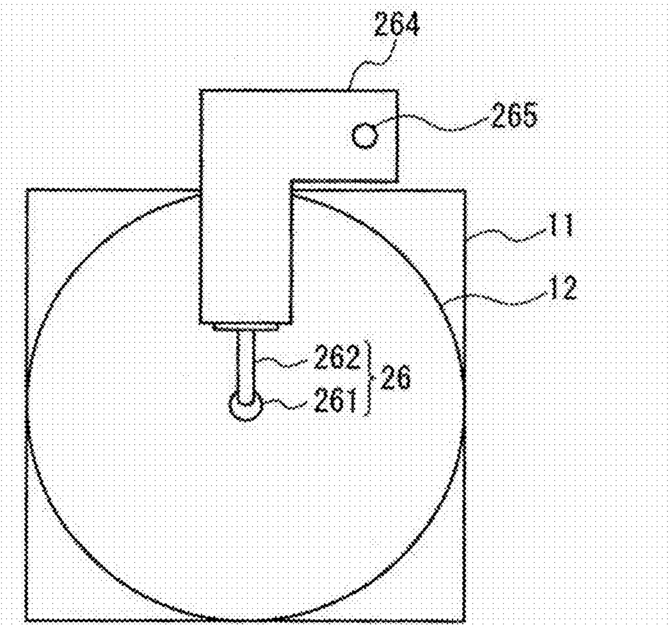
FIG. 2B RETRACTED POSITION
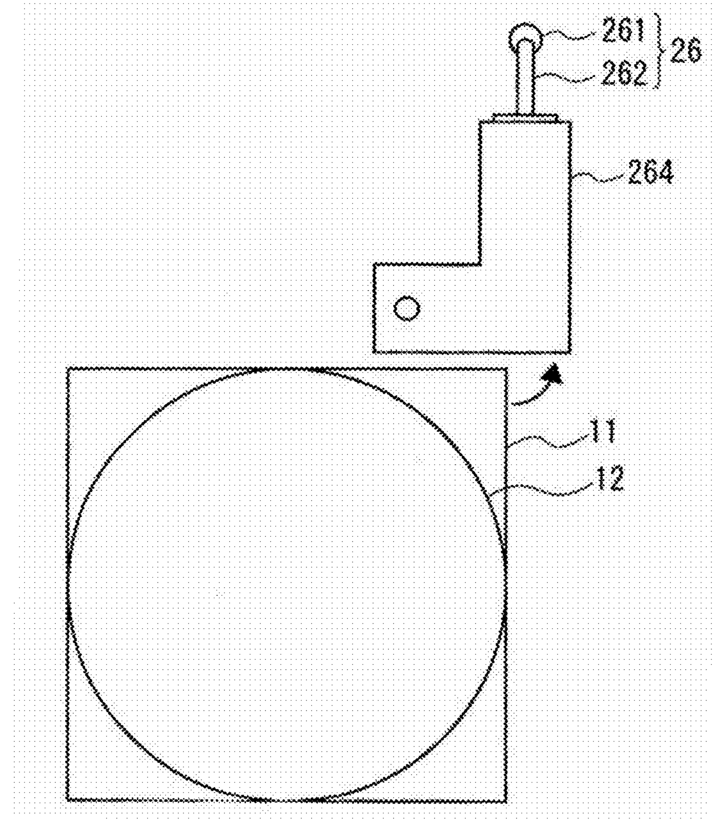

FIG. 4A
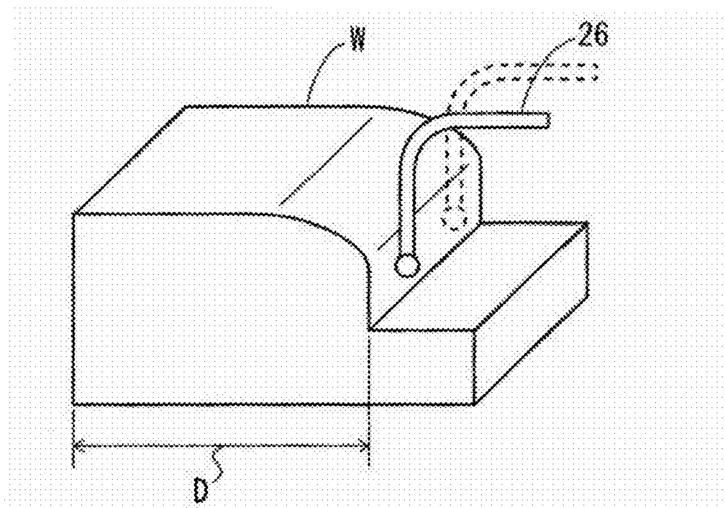
FIG. 4B TRANSMISSION IMAGE
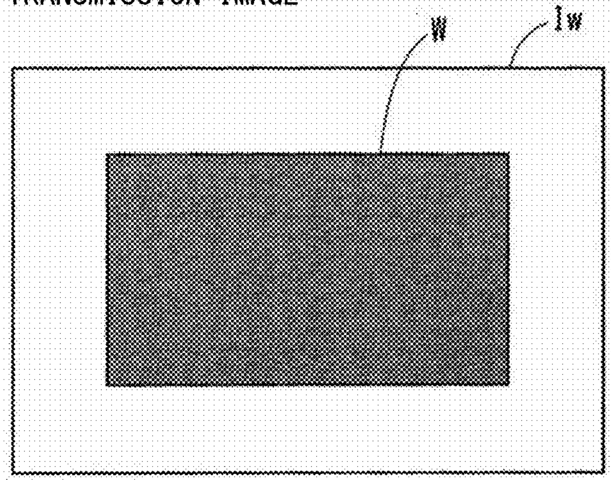
FIG. 4C REFLECTION IMAGE
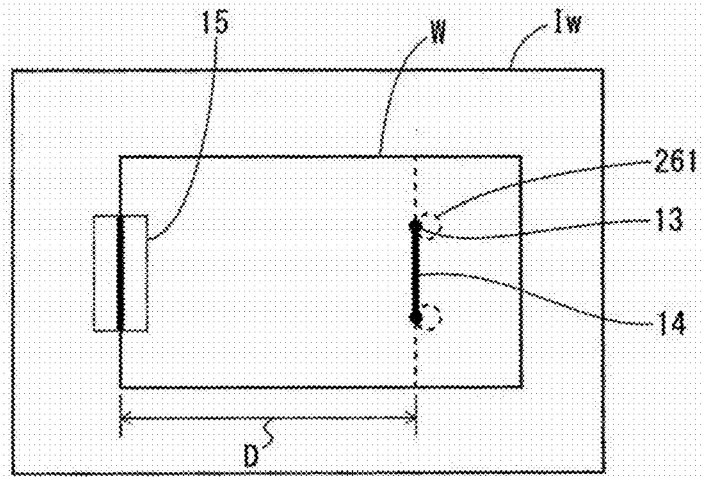

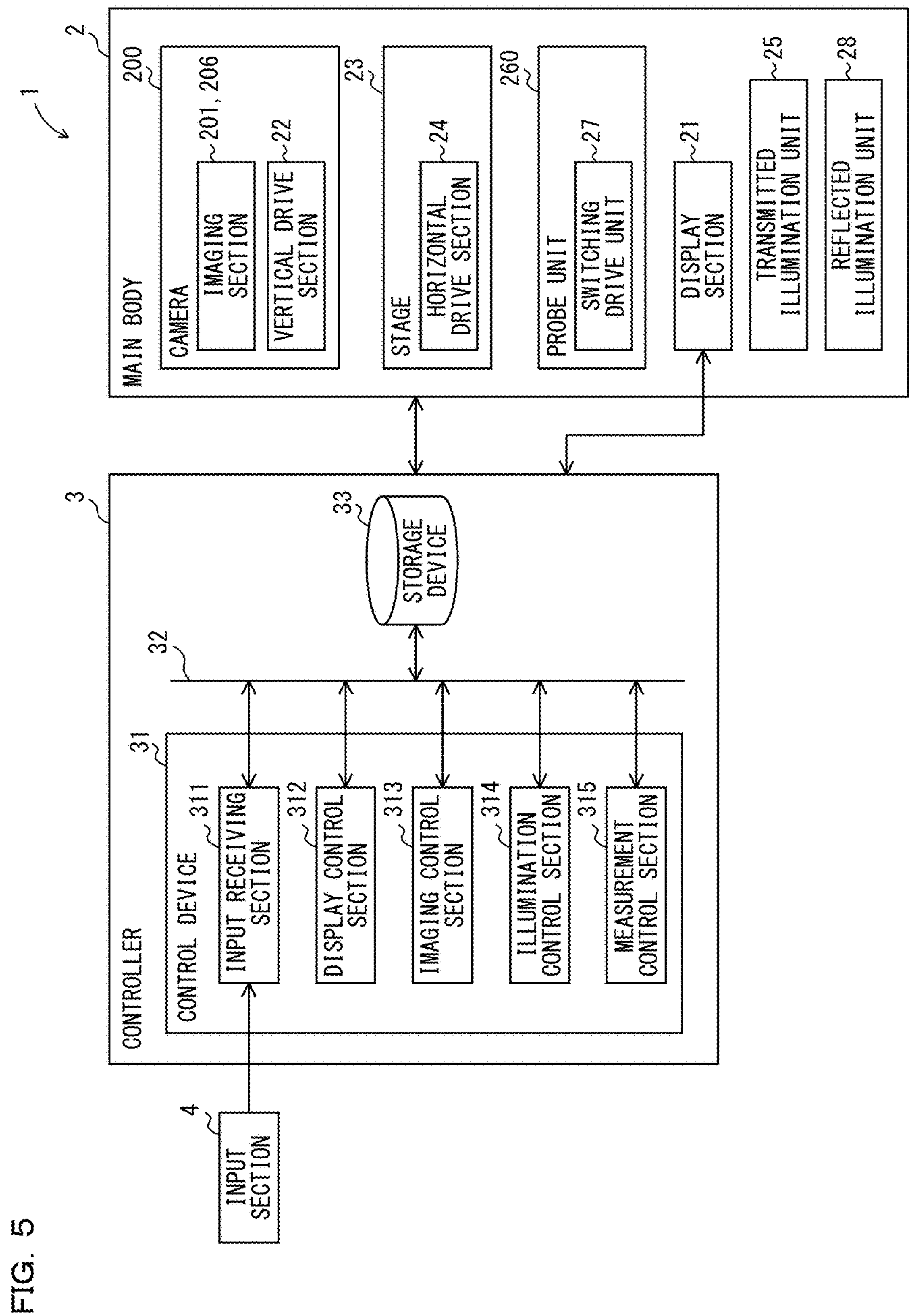
FIG. 5
1
2
MAIN BODY
200
CAMERA
201, 206
IMAGING SECTION
22
VERTICAL DRIVE SECTION
23
STAGE
24
HORIZONTAL DRIVE SECTION
260
PROBE UNIT
27
SWITCHING DRIVE UNIT
21
DISPLAY SECTION
25
TRANSMITTED ILLUMINATION UNIT
28
REFLECTED ILLUMINATION UNIT
3
CONTROLLER
33
STORAGE DEVICE
32
31
CONTROL DEVICE
311
INPUT RECEIVING SECTION
312
DISPLAY CONTROL SECTION
313
IMAGING CONTROL SECTION
314
ILLUMINATION CONTROL SECTION
315
MEASUREMENT CONTROL SECTION
4
INPUT SECTION

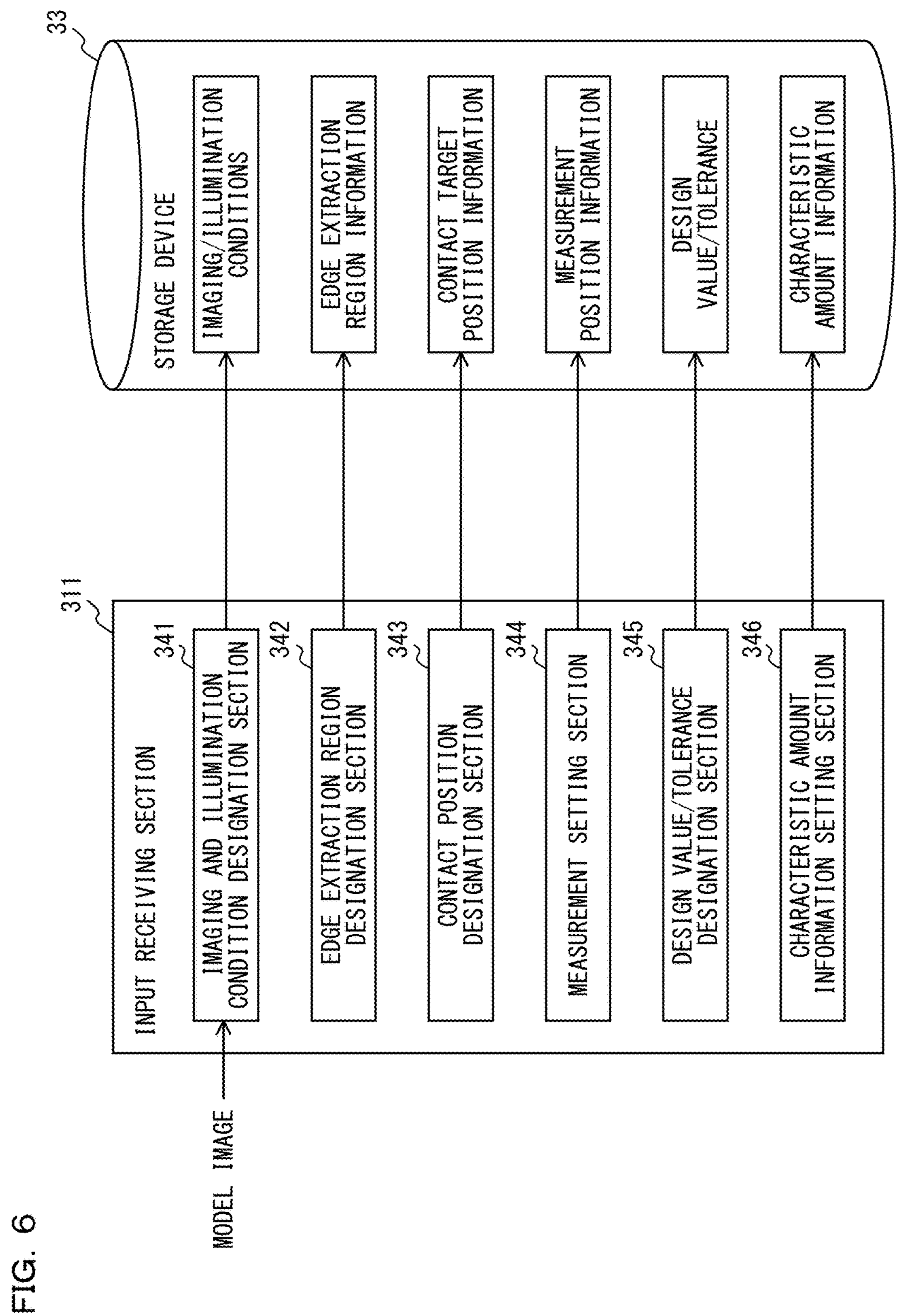
FIG. 6
MODEL IMAGE
311
INPUT RECEIVING SECTION
341
IMAGING AND ILLUMINATION CONDITION DESIGNATION SECTION
342
EDGE EXTRACTION REGION DESIGNATION SECTION
343
CONTACT POSITION DESIGNATION SECTION
344
MEASUREMENT SETTING SECTION
345
DESIGN VALUE/TOLERANCE DESIGNATION SECTION
346
CHARACTERISTIC AMOUNT INFORMATION SETTING SECTION
33
STORAGE DEVICE
IMAGING/ILLUMINATION CONDITIONS
EDGE EXTRACTION REGION INFORMATION
CONTACT TARGET POSITION INFORMATION
MEASUREMENT POSITION INFORMATION
DESIGN VALUE/TOLERANCE
CHARACTERISTIC AMOUNT INFORMATION

FIG. 8

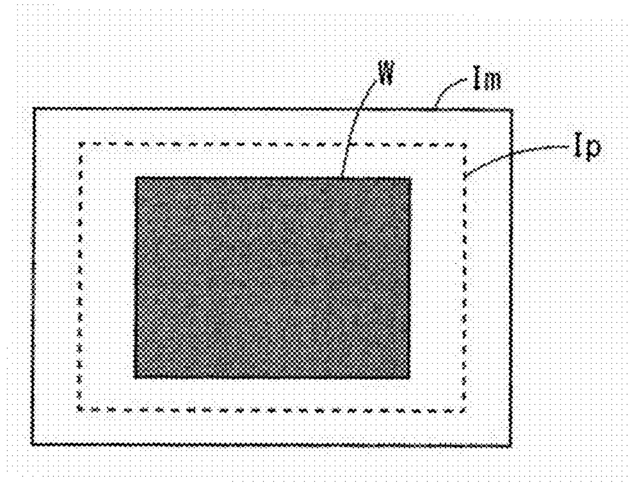

FIG. 9A CASE WHERE THE NUMBER OF DIVISION IS FIXED

| SHAPE TYPE | SCAN PATH |
|---|---|
| STRAIGHT LINE | 2 PATHS (NUMBER OF DIVISION = 3) |
| CIRCLE | 3 PATHS (NUMBER OF DIVISION = 3) |
| ARC | 3 PATHS (NUMBER OF DIVISION = 4) |

FIG. 9B CASE WHERE THE NUMBER OF DIVISION IS VARIED ACCORDING TO SIZE OF MEASUREMENT TARGET

| SHAPE TYPE | SCAN PATH | |
|---|---|---|
| | LENGTH OF CONTOUR LINE < TH | LENGTH OF CONTOUR LINE ≥ TH |
| STRAIGHT LINE | 2 PATHS | 3 PATHS |
| CIRCLE | 3 PATHS | 4 PATHS |
| ARC | 3 PATHS | 4 PATHS |

FIG. 24A FIRST SCAN MODE
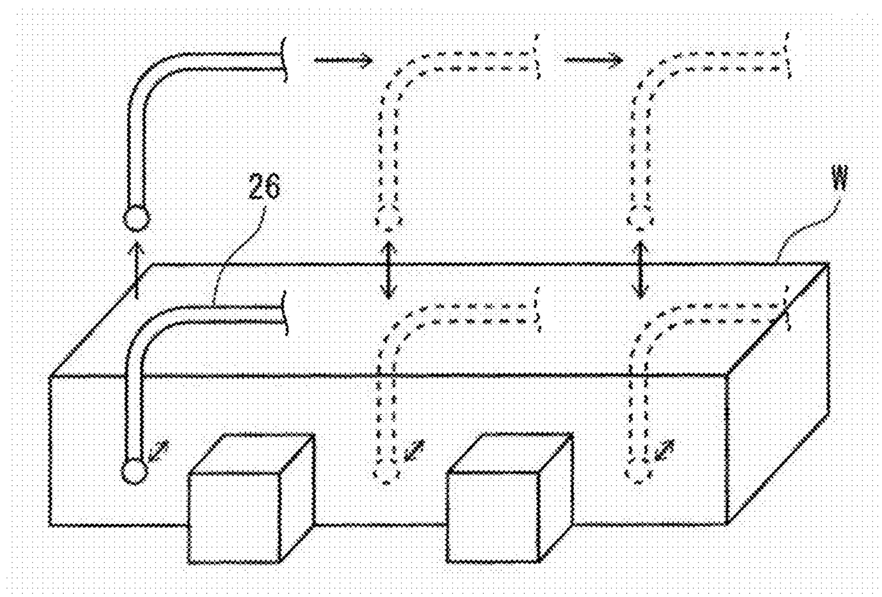
FIG. 24B SECOND SCAN MODE
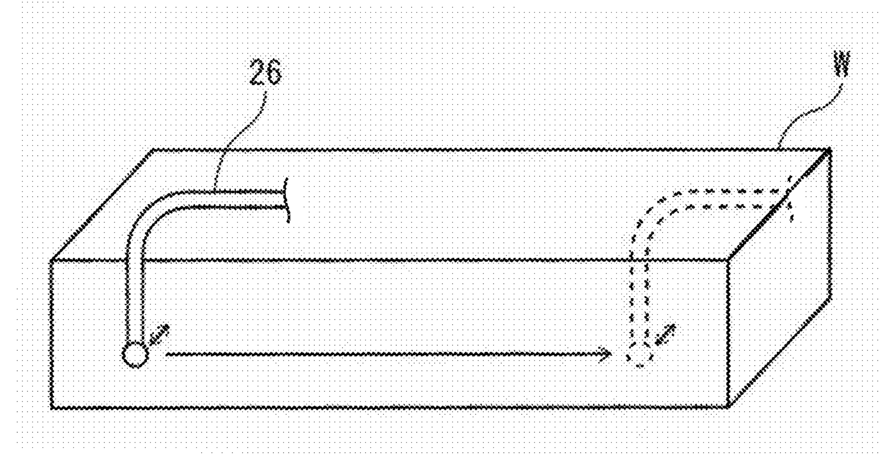

FIG. 30A
CASE 1
CASE 2
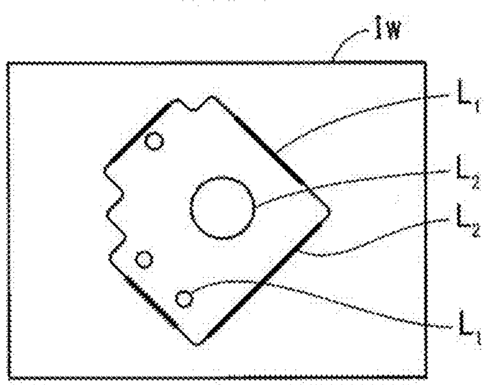
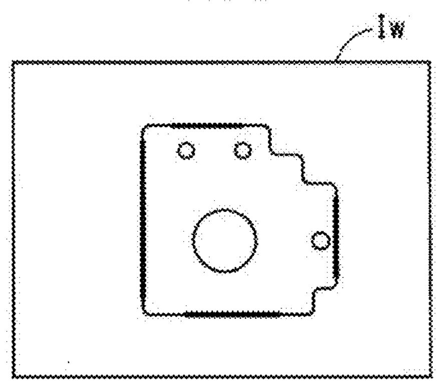
FIG. 30B
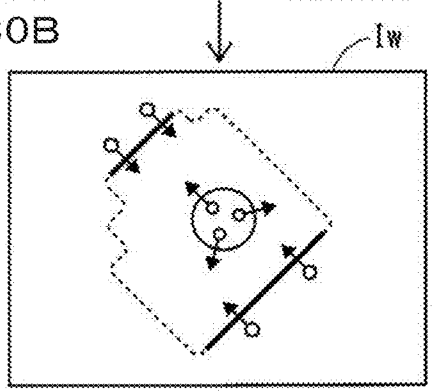
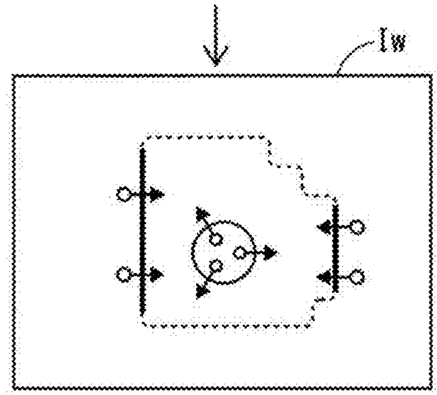
FIG. 30C
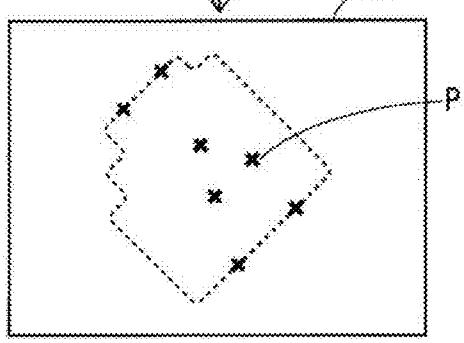
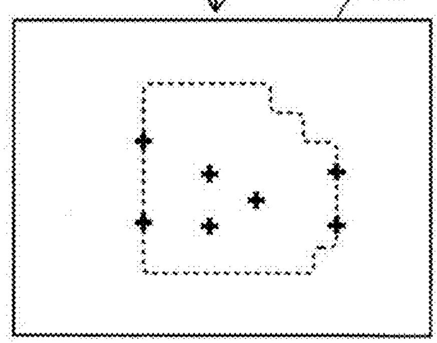
FIG. 30D
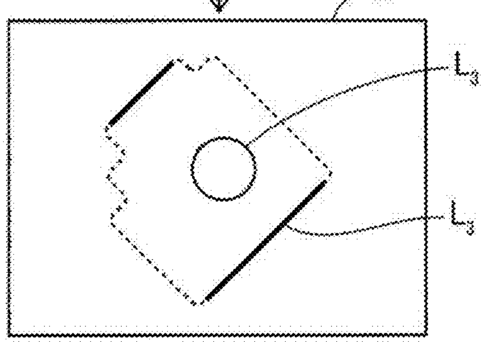
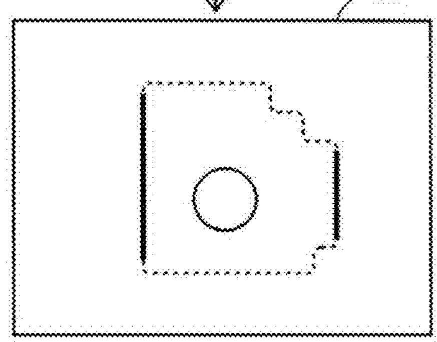

CASE 1
CASE 2
1w
1w
OK
OK
OK
OK
OK
OK
OK
NG

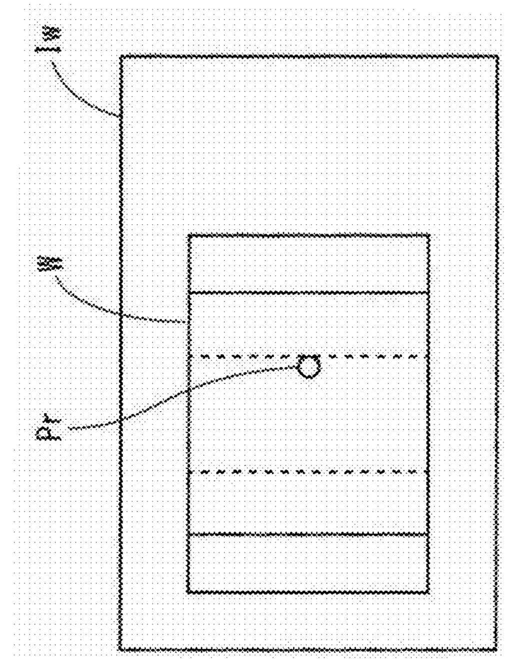
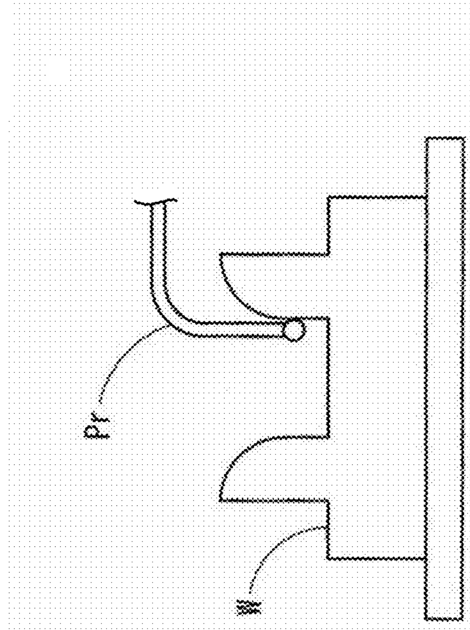
FIG. 34A
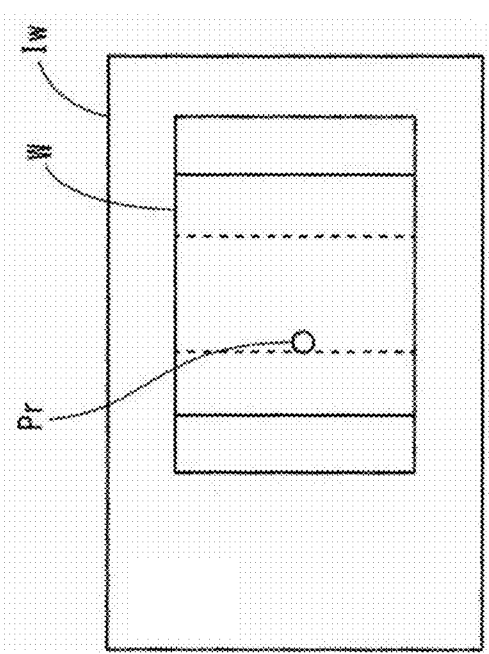
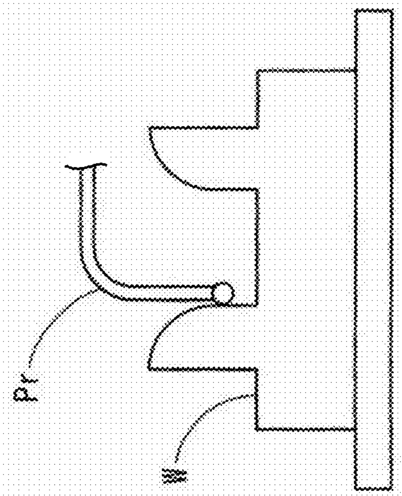
FIG. 34B

IMAGE MEASUREMENT DEVICE

CROSS-REFERENCE TO RELATED APPLICATIONS

The present application claims foreign priority based on Japanese Patent Application No. 2016-132920, filed Jul. 4, 2016, the contents of which is incorporated herein by reference.

BACKGROUND OF THE INVENTION

1. Field of the Invention

The present invention relates to an image measurement device, and more specifically, to an improvement in an image measurement device for causing a probe to contact a workpiece on a stage, detecting a position of the probe based on an image, and determining a dimension of the workpiece.

2. Description of Related Art

An image measurement device is a dimension measurement instrument for acquiring a workpiece image by capturing an image of a workpiece that is placed on a stage, and for determining a dimension of the workpiece by extracting an edge from the workpiece image. A workpiece image shows a shape which is extremely accurate and similar to that of the workpiece regardless of the position of a camera in a height direction, and by determining a distance or an angle in the workpiece image, an actual dimension or angle of the workpiece may be detected.

Edge extraction is performed by analyzing a change in brightness in the workpiece image and detecting edge points, and by fitting a geometric figure such as a straight line, a circle or an arc with a plurality of detected edge points, and a boundary between the workpiece and a background, a contour of a recessed portion or a protruding portion of the workpiece, or the like is determined as an edge. A dimension of the workpiece is determined as the distance or the angle between edges determined in the above manner. Furthermore, the quality of the workpiece is determined by comparing a difference (an error) between a determined dimension value and a design value against a tolerance.

Some image measurement devices as described above determine a dimension of a workpiece placed on a stage by causing a probe to contact a side surface of the workpiece (for example, Guijun Ji, Heinrich Schwenke, Eugen Trapet, "An Opto-mechanical Microprobe System for Measuring Very Small Parts on CMMs", United States of America, The International Society for Optical Engineering (SPIE), Vision Geometry VII, Jul. 20-Jul. 22, 1998, Vol. 3454, pp. 348-353). The probe is arranged within an imaging field of view of a camera, and a contact position of the probe to a workpiece is determined by identifying the position of the probe from an image of the probe which is in contact with a side surface of the workpiece.

FIGS. 33A and 33B, and FIGS. 34A and 34B are diagrams showing example operation of a conventional image measurement device. FIG. 33A shows a workpiece W which is a measurement target, and FIG. 33B shows a workpiece image Iw. The workpiece W includes a base member $w_1$, and two protruding portions $w_2$ formed on the base member $w_1$. In the case of measuring a distance A between inner side surfaces Sa of the two protruding portions $w_2$, a distance B between outer side surfaces Sb, and a distance C between side surfaces Sc of the base member $w_1$, because the inner sides of the protruding portions $w_2$ are curved, accurate identification, from the workpiece image Iw, is more difficult for edges of the side surfaces Sa than for edges of the side surfaces Sb and Sc.

FIG. 34A shows a workpiece image Iw which was captured in a state where a probe Pr was in contact with the side surface Sa of the protruding portion $w_2$ on the right, and FIG. 34B shows a workpiece image Iw which was captured in a state where the probe Pr was in contact with the side surface Sa of the protruding portion $w_2$ on the left. Because the shape and the size of the probe Pr are known in advance, the position of the probe Pr in a workpiece image Iw can be accurately identified. Moreover, the position of a side surface Sa is determined by identifying the contact position based on the amount of displacement of the probe Pr in the imaging field of view. Accordingly, when using this type of image measurement device, a dimension may be accurately determined even for a measurement position where an edge cannot be identified from a workpiece image Iw.

With a conventional image measurement device as described above, in the case of performing dimension measurement using a probe, a target position where the probe is to contact a side surface of a workpiece has to be designated in advance as setting information for dimension measurement. Designation of a contact target position is performed by actually moving the probe to a measurement position while checking the relative positional relationship between the workpiece and the probe. However, contour lines of measurement positions include various shapes such as a circle, an arch and a straight line, and lengths of the contour lines are also varied, and it is difficult for a user to decide where the probe should contact a contour line or how many contact target positions should be designated for a contour line.

SUMMARY OF THE INVENTION

The present invention has been made in view of the above circumstances, and has its object to provide an image measurement device which is capable of simplifying an operation for designating measurement setting information used for performing dimension measurement using a probe. In particular, it is an object to provide an image measurement device which is capable of determining a scan operation of a probe by automatically identifying a plurality of contact target positions by designating a measurement element in a model image.

According to one embodiment of the invention, an image measurement device includes a stage where a workpiece is to be placed, a light projection section for radiating detection light on the workpiece on the stage, an imaging section for receiving the detection light from the workpiece, and for generating a workpiece image, a probe that is provided in a manner capable of being arranged in an imaging field of view of the imaging section, a horizontal drive section for causing the probe to contact a side surface of the workpiece that is placed on the stage, by moving the stage and the probe relative to each other in a direction parallel to an upper surface of the stage, a display section for displaying, at a time of measurement setting, a model image for setting that is generated based on design data of the workpiece or image data obtained by capturing an image of the workpiece by the imaging section, an input receiving section for receiving designation of a measurement element for which measurement is to be performed by the probe, in the model image that is displayed by the display section, a storage section storing, in advance, an arrangement rule defining a relationship between a shape type or a size of a measurement element that can be designated by the input receiving section and arranged positions of contact target positions of the probe, and a measurement control section for identifying, at a time of measurement execution, contact target positions of the probe based on a position of the measurement element designated by the input receiving section, a shape type or a size of the measurement element, and the arrangement rule that is stored in the storage section, and for controlling the horizontal drive section so that the probe sequentially moves to the plurality of contact target positions identified.

According to such a configuration, because a plurality of contact target positions on a side surface of the workpiece where the probe should contact are identified based on the position of a measurement element, the shape type or the size of the measurement element, and the arrangement rule, a plurality of contact target positions may be automatically identified and a scan operation of the probe may be determined by designating a measurement element in the model image.

According to another embodiment of the invention, in addition to the configuration described above, the image measurement device further includes a display control section for displaying a symbol indicating a contact target position of the probe in the model image that is displayed by the display section, where the input receiving section receives a change in the contact target position based on a user operation.

According to such a configuration, a user may adjust a contact target position of the probe while checking the model image. Accordingly, even if there is a variance in workpiece dimension accuracy, the probe may be prevented from colliding into the workpiece at the time of moving between scan paths.

According to still another embodiment of the invention, in addition to the configuration described above, the image measurement device is configured such that the arrangement rule is determined such that, in a case where the shape type is a circle or an arc, three or more of the contact target positions are arranged at regular intervals in a circumferential direction of the circle or the arc.

According to still another embodiment of the invention, in addition to the configuration described above, the image measurement device is configured such that the arrangement rule is determined such that, in a case where the shape type is a straight line, two or more of the contact target positions are arranged at regular intervals in a direction of the straight line.

According to still another embodiment of the invention, in addition to the configuration described above, the image measurement device is configured such that the input receiving section receives setting of an edge extraction region on the measurement element, and the measurement control section extracts an edge from the edge extraction region that is set on the measurement element and identifies a contour line of the measurement element, identifies the plurality of contact target positions as positions on the contour line, and identifies a start position of a scan operation where the probe is to approach at a position that is separated from the contact target positions in a normal direction of the contour line. According to such a configuration, by setting a region for edge extraction on a measurement element, a plurality of contact target positions may be automatically identified, and a scan operation of the probe may be determined.

According to still another embodiment of the invention, in addition to the configuration described above, the image measurement device is configured such that the input receiving section receives a change in the number of the contact target positions on the contour line or in a scan direction of approach of the probe. According to such a configuration, the number of contact target positions or the scan direction may be adjusted.

According to still another embodiment of the invention, in addition to the configuration described above, the image measurement device is configured such that, in a case where the symbol overlaps the contour line, the display section displays an error. According to such a configuration, whether the probe and the workpiece interfere with each other may be easily checked.

According to still another embodiment of the invention, in addition to the configuration described above, the image measurement device further includes a vertical drive section for moving the stage and the probe relative to each other in an optical axis direction of the imaging section, where the input receiving section designates height information of a side surface of the workpiece where the probe should contact as a contact target position, the measurement control section controls the vertical drive section based on the height information, and adjusts a height of the probe relative to the stage, and the input receiving section further receives a change in the height information. According to such a configuration, the probe may be made to contact a side surface of the workpiece at a desired height with respect to the stage.

According to still another embodiment of the invention, in addition to the configuration described above, the image measurement device is configured such that the input receiving section receives a user operation for designating one of a first scan mode and a second scan mode with mutually different movement methods for relatively moving the probe with respect to the stage, between contact target positions, the vertical drive section switches the height of the probe relative to the stage between a measurement height and a reference height that is higher than the measurement height, and the measurement control section controls the vertical drive section and switches the probe from the measurement height to the reference height at each time of movement between contact target positions, in a case where the first scan mode is designated, and causes the probe to relatively move with respect to the stage, between contact target positions, without being switched to the reference height, in a case where the second scan mode is designated.

According to such a configuration, a user is enabled to select the first scan mode in which collision between the probe and the workpiece may be reliably prevented, or the second scan mode in which the time required for dimension measurement by the probe may be reduced.

According to still another embodiment of the invention, in addition to the configuration described above, the image measurement device is configured such that, in a case where the second scan mode is designated, if a plurality of contact target positions are designated for one measurement element with which a geometric figure is to be fitted, the measurement control section causes the probe to relatively move with respect to the stage, between the contact target positions, without being switched to the reference height, and controls the vertical drive section and switches the probe from the measurement height to the reference height when causing the probe to relatively move with respect to the stage, between two different measurement elements.

According to such a configuration, collision between the probe and the workpiece at the time of the probe moving between measurement elements may be reliably prevented while reducing the time required to detect a plurality of contact positions for one measurement element.

According to still another embodiment of the invention, in addition to the configuration described above, the image measurement device further includes a contact detection section for detecting contact of the probe with a side surface of the workpiece, where, when contact is detected by the contact detection section, the measurement control section controls the imaging section and acquires workpiece images of the probe that is in contact with a side surface of the workpiece, identifies a plurality of contact positions where the probe contacted the workpiece, based on positions of the probe in the workpiece images and a relative position of the imaging field of view with respect to the stage, and determines a dimension of the workpiece based on the plurality of contact positions identified. According to such a configuration, because the contact detection section is provided, a workpiece image of the probe which is in contact with a side surface of the workpiece may be acquired. Also, a contact position of the probe and the workpiece may be identified from such a workpiece image, and a dimension of the workpiece may thereby be determined.

According to still another embodiment of the invention, in addition to the configuration described above, the image measurement device is configured such that the storage section further stores characteristic amount information for identifying a position and an attitude of the workpiece from the workpiece image, and the measurement control section identifies the position and the attitude of the workpiece from the workpiece image based on the characteristic amount information, identifies the plurality of contact target positions on a side surface of the workpiece where the probe should contact, based on the identified position and the identified attitude of the workpiece, and controls the horizontal drive section so that the probe sequentially moves to the plurality of contact target positions identified. According to such a configuration, dimension measurement by the probe may be performed regardless of the position and the attitude of the workpiece in the imaging field of view.

According to still another embodiment of the invention, in addition to the configuration described above, the image measurement device is configured such that the measurement control section identifies an edge extraction region based on the position and the attitude of the workpiece, in a case where the edge extraction region is designated on the measurement element, and determines a dimension of the workpiece based on a contour line identified by extracting an edge from the edge extraction region identified and a contour line identified by contact of the probe.

According to such a configuration, a dimension of the workpiece may be determined by identifying, by contact of the probe with the workpiece, a contour line at a measurement position where an edge cannot be accurately extracted, and by identifying, by edge extraction from the workpiece image, a contour line at a measurement position where an edge can be accurately extracted.

According to still another embodiment of the invention, in addition to the configuration described above, the image measurement device further includes a switching drive section for switching between a state where the probe is positioned at a measurement position in the imaging field of view and a state where the probe is positioned at a retracted position that is reached by the probe moving in a direction away from a center of the imaging field of view, where the measurement control section identifies the edge extraction region from the workpiece image generated in a state where the probe is at the retracted position, and performs edge extraction. According to such a configuration, the workpiece image for identifying an edge extraction region is generated in a state where the probe is at the retracted position, and thus, the probe may be prevented from being captured overlapping the workpiece or from being captured near the workpiece.

According to still another embodiment of the invention, in addition to the configuration described above, the image measurement device is configured such that, in a case where an edge extraction region is designated on the measurement element, the measurement control section determines a scan direction for when the probe is to approach a side surface of the workpiece, based on a difference in brightness between both ends of an edge that is extracted from the edge extraction region. According to such a configuration, the burden of having to designate the scan direction for each contact target position may be eliminated.

According to the present invention, an operation for designating measurement setting information used for performing dimension measurement using a probe may be simplified. In particular, because a plurality of contact target positions on a side surface of the workpiece where the probe should contact are identified based on the position of a measurement element, the shape type or the size of the measurement element, and the arrangement rule, a plurality of contact target positions may be automatically identified and a scan operation of the probe may be determined by designating a measurement element in a model image.

BRIEF DESCRIPTION OF THE DRAWINGS

FIGS. 2A and 2B are explanatory diagrams schematically showing an example of operation of the image measurement device in FIG. 1;

FIGS. 4A to 4C are diagrams showing an example of operation of the image measurement device in FIG. 1, and show a case of identifying the position of a contour line and calculating a distance between side surfaces of a workpiece;

FIG. 5 is a block diagram showing an example configuration of a controller in FIG. 1;

FIG. 6 is a block diagram showing an example configuration of an input receiving section in FIG. 5;

FIG. 8 is a diagram showing an example of operation at the time of pattern image registration at the input receiving section in FIG. 5;

FIGS. 9A and 9B are diagrams showing examples of operation at the time of contact position designation at the input receiving section in FIG. 5, and show tables associating a shape type and the number of scan paths;

FIGS. 24A and 24B are diagrams showing examples of operation for a case of designating a movement method that is used at the time of the probe moving between contact target positions;

FIGS. 30A to 30D are diagrams showing examples of operation at the time of successive measurement at the image measurement device in FIG. 1;

FIGS. 34A and 34B are diagrams showing an example of operation of the conventional image measurement device.

DETAILED DESCRIPTION OF PREFERRED EMBODIMENTS

<Image Measurement Device 1>

Figure 1:
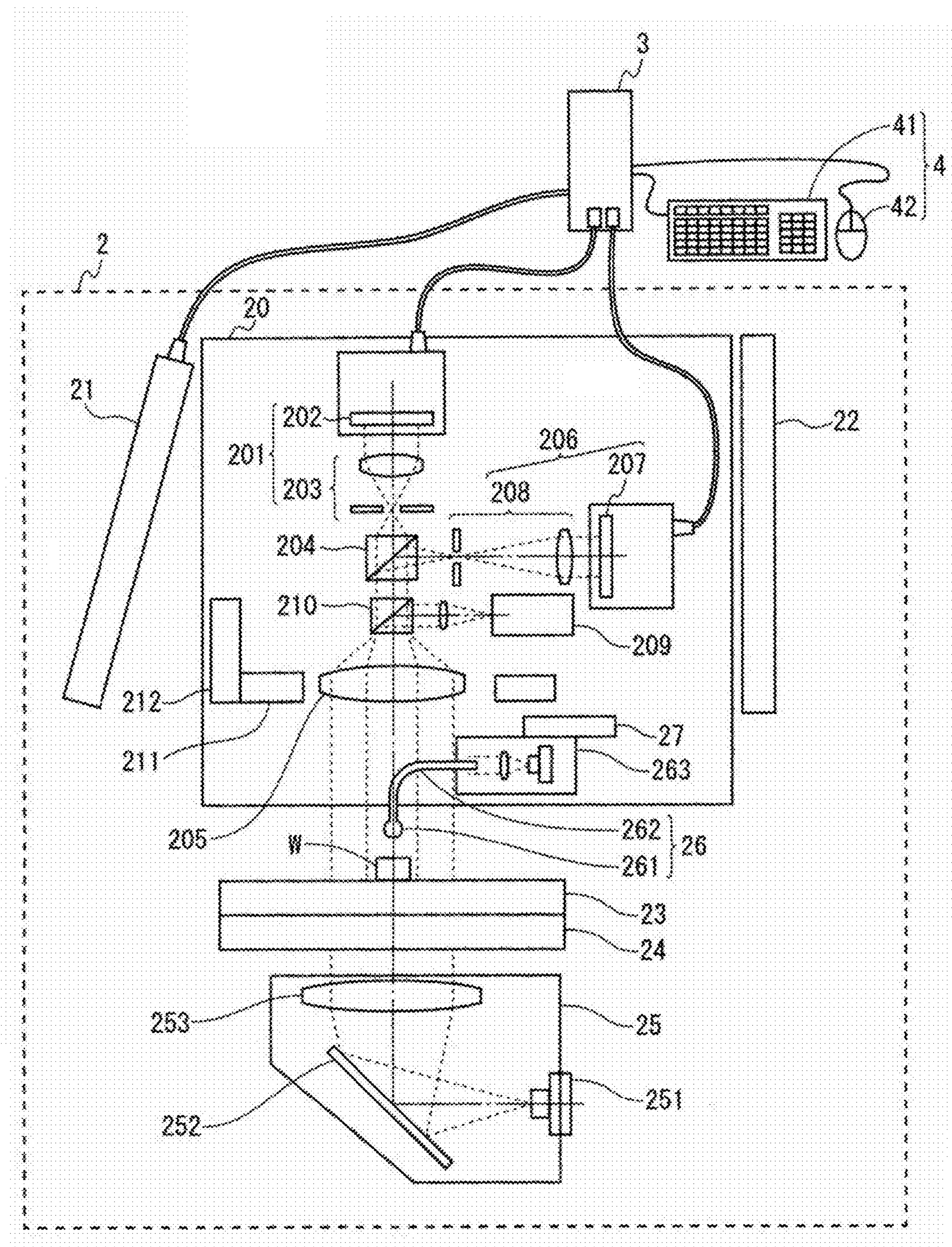
FIG. 1 is a system diagram showing an example configuration of an image measurement device according to an embodiment of the present invention.

FIG. 1 is a system diagram showing an example configuration of an image measurement device 1 according to an embodiment of the present invention. The image measurement device 1 is a dimension measurement instrument for determining a dimension of a workpiece W by extracting an edge from a workpiece image of the workpiece W on a stage 23, and also, by causing a probe 26 to contact the workpiece W on the stage 23 and identifying the contact position, and includes a main body 2, a controller 3, a keyboard 41, and a mouse 42. The workpiece W is a measurement target object, the shape or the dimension of which is to be measured.

The main body 2 includes a measurement unit 20, a display section 21, a vertical drive section 22, a stage 23, a horizontal drive section 24, and a transmitted illumination unit 25, and generates a workpiece image by radiating detection light of visible light on a workpiece W on the stage 23 and receiving the transmitted light or the reflected light. When referring to the front surface direction of the display section 21 as a front-back direction, the display section 21 is arranged on the front side of the measurement unit 20.

Here, a process of determining a dimension of a workpiece W by extracting an edge from a workpiece image will be referred to as image measurement, and a process of determining a dimension of a workpiece W by detecting the position of the probe 26 from a workpiece image obtained in a state where the probe 26 is in contact with a side surface of the workpiece W and identifying coordinates of the contact position of the probe 26 and the workpiece W will be referred to as probe measurement.

The display section 21 is a display device for displaying a workpiece image or a measurement result. The vertical drive section 22 moves the measurement unit 20 and the stage 23 relative to each other in the vertical direction so as to adjust the height of a focus position or the height of the probe 26 relative to the stage 23. The vertical drive section 22 is capable of moving the measurement unit 20 in the vertical direction. Additionally, the vertical drive section 22 may alternatively be configured to be capable of separately adjusting the height of the probe 26 with respect to the measurement unit 20.

The stage 23 is a work table having a flat, horizontal mounting surface where a workpiece W is to be mounted. For example, the stage 23 is a glass plate which transmits detection light. The horizontal drive section 24 moves the measurement unit 20 and the stage 23 relative to each other in a direction parallel to the upper surface of the stage 23 so as to adjust the position of an imaging field of view or the position of the probe 26 with respect to the stage 23. The horizontal drive section 24 is capable of moving the stage 23 in any direction on the horizontal plane.

The transmitted illumination unit 25 is a light projection device for radiating detection light on a workpiece W on the stage 23 from below, and includes a transmitted illumination light source 251, a mirror 252, and a condenser lens 253. The transmitted illumination light source 251 is arranged toward the front. Detection light emitted from the transmitted illumination light source 251 is reflected upward by the mirror 252, and is emitted through the condenser lens 253. The detection light is transmitted through the stage 23, and a part of the transmitted light is blocked by the workpiece W, and the rest enters an objective lens 205 of the measurement unit 20.

<Measurement Unit 20>

The measurement unit 20 is a light projection/reception unit for radiating detection light on a workpiece W on the stage 23, and receiving detection light from the workpiece W, and includes the probe 26, a switching drive section 27, imaging sections 201, 206, half mirrors 204, 210, the objective lens 205, a coaxial epi-illumination light source 209, a ring illumination unit 211, a ring illumination vertical drive section 212, and a probe light source 263.

The objective lens 205 is a light receiving lens for condensing detection light from a workpiece W, and is arranged facing the stage 23. The imaging sections 201 and 206 are cameras for capturing images of a workpiece W on the stage 23 through the common objective lens 205, and for generating workpiece images.

The imaging section 201 is an imaging device with low imaging magnification, and includes an imaging sensor 202, and a low power-side imaging lens section 203 including an imaging lens and a diaphragm plate. The imaging sensor 202 receives detection light from a workpiece W through the low power-side imaging lens section 203, and generates a workpiece image. The imaging sensor 202 is arranged with a light receiving surface facing downward.

The imaging section 206 is an imaging device with high imaging magnification, and includes an imaging sensor 207, and a high power-side imaging lens section 208 including an imaging lens and a diaphragm plate, and forms, on the stage 23, an imaging field of view which is coaxial with the imaging field of view of the imaging section 201. The imaging sensor 207 receives detection light from a workpiece W through the high power-side imaging lens section 208, and generates a workpiece image. The imaging sensor 207 is arranged with a light receiving surface facing the front. Detection light which is transmitted through the objective lens 205 is reflected toward the back by the half mirror 204, and an image is formed on the imaging sensor 207 through the high power-side imaging lens section 208.

As the imaging sensors 202 and 207, image sensors such as charge coupled devices (CCD) or complementary metal oxide semiconductors (CMOS) are used, for example. As the objective lens 205, a telecentric lens having a property that the size of an image is not changed even when the position of the objective lens 205 in the vertical direction, that is, an optical axis direction, is changed is used.

The coaxial epi-illumination light source 209 is a projection light source device for radiating detection light on a workpiece W on the stage 23 from vertically above, and is arranged facing the front. The detection light emitted by the coaxial epi-illumination light source 209 is reflected downward by the half mirror 210, and is emitted through the objective lens 205.

The ring illumination unit 211 is a light projection device for radiating detection light on a workpiece W on the stage 23 from above or the side, and has a ring shape surrounding the objective lens 205. The ring illumination vertical drive section 212 moves the ring illumination unit 211 in the vertical direction so as to adjust the radiation angle of detection light on the stage 23. One of transmitted illumination, ring illumination, and coaxial epi-illumination may be selected as the method for illuminating the workpiece W.

<Probe 26>

The probe 26 is a contactor for measuring a dimension of a workpiece W by coming into contact with a side surface of the workpiece W placed on the stage 23. The probe 26 is arranged in a manner capable of moving between inside the imaging field of view of the imaging section 201 and a retracted position. Also, the probe 26 is a light-emitting probe, and includes a spherical contact section 261 which is to contact a workpiece W, and a metal tube 262 for transmitting guide light.

An optical fiber for transmitting guide light is accommodated inside the metal tube 262. The metal tube 262 is formed by an SUS tube having sufficient strength, and the shape of the metal tube 262 does not change even when the contact section 261 contacts a workpiece W.

The contact section 261 is arranged at a distal end of the metal tube 262 extending from the probe light source 263, and diffusely radiates guide light. The cross-sectional area of the spherical contact section 261 in the horizontal direction is larger than the cross-sectional area of the metal tube 262 in the horizontal direction, and thus, even when an image of the contact section 261 is captured from above by the imaging section 201, the contour of the contact section 261 may be captured. The probe light source 263 is a light source device for generating guide light of visible light, and of causing the light to enter the metal tube 262.

The switching drive section 27 is a horizontal drive section for alternately switching between a state where the probe 26 is positioned at a measurement position in the imaging field of view and a state where the probe 26 is positioned at a retracted position by being moved in the direction away from the center of the imaging field of view. The switching drive section 27 is a rotation drive section for rotating the probe light source 263 around a rotation axis in the vertical direction, and causes the probe 26 to move between the retracted position and the measurement position by rotating the probe light source 263. For example, the retracted position is preferably outside the imaging field of view of the imaging section 201, but may be a circumferential edge portion of the imaging field of view as long as the probe 26 is not shown as a subject in a workpiece image.

The controller 3 is a control unit for controlling imaging or screen display by the main body 2, and for analyzing a workpiece image and determining a dimension of a workpiece W by calculation, and the keyboard 41 and the mouse 42 are connected to the controller 3. The keyboard 41 and the mouse 42 are an input section 4 allowing a user to perform operation input.

FIGS. 2A and 2B, FIGS. 3A to 3C, and FIGS. 4A to 4C are explanatory diagrams schematically showing examples of operation of the image measurement device 1 in FIG. 1. FIGS. 2A and 2B show a state where the probe 26 extending from an attachment arm 264 is seen from vertically above. FIG. 2A shows a case where the probe 26 is at the measurement position, and FIG. 2B shows a case where the probe 26 is at the retracted position.

The attachment arm 264 is an attachment member for attaching the probe 26 to a housing of the measurement unit 20, and is L-shaped. A rotation shaft 265 extending along the vertical direction is arranged at one end of the attachment arm 264, and the probe 26 protrudes from the surface on the other end. The attachment arm 264 supports the metal tube 262 by a floating structure. When the contact section 261 contacts a side surface of a workpiece W, the metal tube 262 is offset in X and Y directions by the contact without being deformed. The position of the contact section 261 on the workpiece image is thereby changed.

An imaging area 11 is a region, on the stage 23, corresponding to the imaging field of view of the imaging section 201, and has a rectangular shape. A light transmissive area 12 is a circular region, on the stage 23, irradiated by detection light from the transmitted illumination unit 25, and is formed in the imaging area 11.

When the probe 26 is at the measurement position, the contact section 261 is arranged at the center of imaging area 11 and the light transmissive area 12. The contact section 261 is shown as a subject in a workpiece image captured in such a state. When the switching drive section 27 is controlled and the attachment arm 264 is rotated by about 180 degrees from the state where the probe 26 is at the measurement position, the probe 26 is moved to the retracted position.

The retracted position is a position to which the probe 26 is to be retracted so that the probe 26 is not shown in a workpiece image as a subject, and is determined in advance. When the probe 26 is at the retracted position, the contact section 261 and the metal tube 262 are arranged outside the imaging area 11.

Figure 3A:
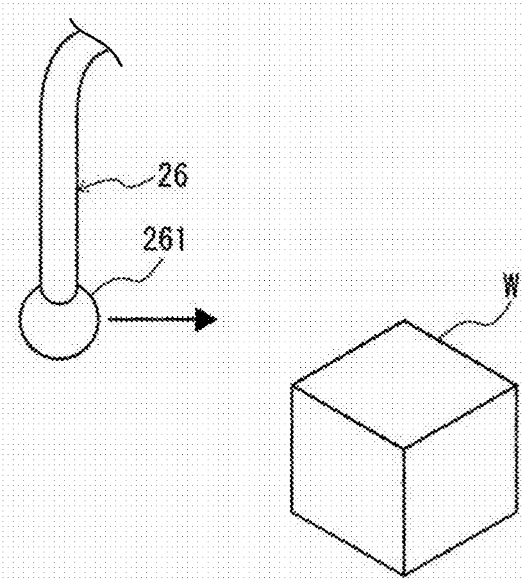
FIGS. 3A to 3C are explanatory diagrams schematically showing an example of operation at the time of causing a probe to contact a workpiece on a stage.
Figure 3B:
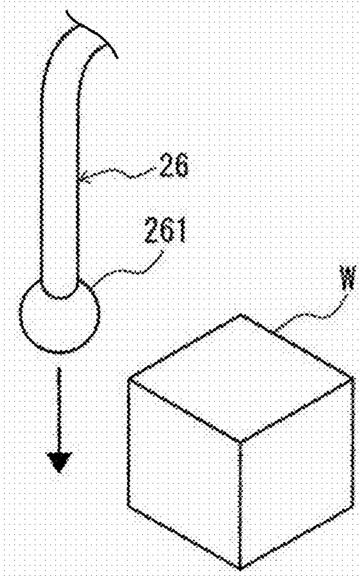
Figure 3C:
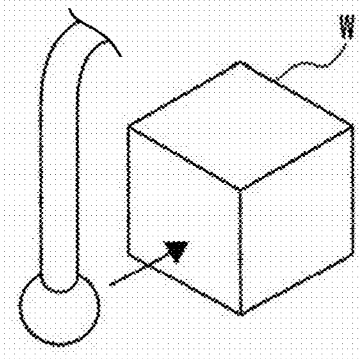

FIGS. 3A to 3C show an example of operation at the time of causing the probe 26 to contact a workpiece W on the stage 23. FIG. 3A shows a case where the probe 26 is relatively moved, at a reference height, with respect to the stage 23 to a position corresponding to a start position of a scan path, and FIG. 3B shows a case where the probe 26 is moved vertically downward from the reference height to a measurement height. FIG. 3C shows a case where the probe 26 is relatively moved along the scan path, at the measurement height, with respect to the stage 23.

In dimension measurement using the probe 26, a contact target position used at the time of causing the probe 26 to contact a side surface of a workpiece W, and a scan path which passes through the contact target position are designated in advance. The reference height is a height at which the probe 26 does not interfere with the workpiece W on the stage 23. By controlling the horizontal drive section 24, the probe 26 may be relatively moved, at the reference height, in a horizontal direction with respect to the stage 23. Additionally, the reference height may be designated to be a height at which a distal end portion of the probe 26 is outside the range of depth of field of the imaging section 201 or 206.

The measurement height is the height of the side surface of a workpiece where the probe 26 should contact, and is vertically lower than the reference height. The vertical drive section 22 switches the height of the probe 26 with respect to the stage 23 between the measurement height and the reference height, which is higher than the measurement height. When the probe 26 is relatively moved with respect to the stage 23 in a scan direction from a start position to an end position along the scan path, the contact section 261 may be made to contact a side surface of a workpiece W. When the probe 26 is detected to have contacted a side surface of the workpiece W, the probe 26 is immediately stopped relative to the stage 23.

The start position of a scan path is an operation start position where the scan operation is to be started, and the end position is an operation end position where the scan operation is to be ended. By determining the end position in advance, a contact error may be detected when the end position is reached by the probe 26. The start position and the end position of the scan path are set on the scan path in a manner passing through contact target positions and along a normal line of a contour line of the workpiece W.

FIGS. 4A to 4C show a case of identifying the position of a contour line 14, and calculating a distance D between side surfaces of a workpiece W. FIG. 4A shows a workpiece W which is the measurement target, and the probe 26 which is in contact with a right side surface of the workpiece W. The workpiece W has stair-like steps, and a distance D between the right side surface and the left side surface of the upper step is measured.

FIG. 4B shows a workpiece image Iw which is a transmission image captured by transmitted illumination. A transmission image allows identification of an outer edge of the workpiece W by edge extraction, but a contour line inside the outer edge is difficult to identify by edge extraction.

FIG. 4C shows a workpiece image Iw which is a reflection image captured by reflected illumination. Reflected illumination is an illumination method using coaxial epi-illumination or ring illumination, and allows identification, by edge extraction, of a contour line inside the outer edge of the workpiece W. However, the upper step portion of the workpiece W has a curved shape at the upper right portion, and a contour line of the right side surface is more difficult to accurately identify by edge extraction compared to a contour line of the left side surface. In such a case, a contour line 14 of the right side surface may be accurately identified by causing the probe 26 to come into contact.

The workpiece image Iw shown in FIG. 4C displays a contour line 14 of the right side surface identified by the probe 26 coming into contact, and a contour line 14 of the left side surface identified by extraction of an edge in an edge extraction region 15.

Contact of the probe 26 with a side surface of the workpiece W may be detected based on whether or not the position, in the workpiece images Iw, of the contact section 261 moving along the scan path has changed by an amount at or above a predetermined threshold within a predetermined period of time. The position of the contact section 261 is identified by determining the center of a circle from the edge of the contact section 261, for example. Also, the normal direction or a contact position 13 on a side surface of the workpiece W may be identified in the workpiece image Iw in which the probe 26 is in contact with the side surface of the workpiece W, based on the direction of displacement of the contact section 261 with respect to the center of the imaging field of view.

Additionally, in the case of horizontally moving the probe 26 itself, contact with a side surface of a workpiece is detected based on whether the contact section 261 moving along the scan path has stopped in the workpiece image Iw.

Because the shape of the contact section 261 is already known, the position of the contact section 261 may be highly accurately identified by using a known search technique. Accordingly, even in a case where an edge is round and cannot be accurately detected in a two-dimensional workpiece image Iw, as in the case of the workpiece W in FIGS. 4A to 4C, the dimension of an edge which is difficult to detect in an image can be highly accurately determined by identifying, from the position of the contact section 261, the coordinates of the contact position 13 of the probe 26 and the workpiece W.

The contact position 13 is identified by identifying the position of the contact section 261 in the workpiece image Iw, and offsetting the position in the normal direction by a distance corresponding to the radius of the contact section 261. Also, the position of the contour line 14 of the right side surface is determined by fitting a geometric figure designated in advance with a plurality of contact positions 13. For its part, the position of the contour line 14 of the left side surface is determined by detecting edge points from the edge extraction region 15 in the workpiece image Iw, and fitting a geometric figure with a plurality of edge points which have been detected. The distance D between the right side surface and the left side surface is calculated based on the positions of the contour lines 14 identified in the above manner.

<Controller 3>

FIG. 5 is a block diagram showing an example configuration of the controller 3 in FIG. 1. The controller 3 includes a control device 31 and a storage device 33, and the control device 31 and the storage device 33 are interconnected by a bus 32. The control device 31 includes an input receiving section 311, a display control section 312, an imaging control section 313, an illumination control section 314, and a measurement control section 315. The main body 2 includes a camera 200 including the imaging sections 201, 206 and the vertical drive section 22, the stage 23 including the horizontal drive section 24, a probe unit 260 including the switching drive section 27, the display section 21, the transmitted illumination unit 25, and a reflected illumination unit 28. The reflected illumination unit 28 is configured from the coaxial epi-illumination light source 209 and the ring illumination unit 211.

The display control section 312 displays a model image and setting information for dimension measurement on the display section 21. A model image may be a master piece image of a master piece, or may be a CAD image based on CAD data created by CAD (Computer Aided Design), for example.

In the case of displaying a model image generated from design data on the display section 21, the display control section 312 displays a model image generated from design data, by assuming image data that is obtained by capturing, from above, an image of the workpiece W placed on the stage 23. This allows even a model image generated from design data to be displayed at the same angle as a workpiece image captured by the imaging section 201 or 206, and designation of contact target position information may be facilitated.

Based on a user operation received at the input section 4, the input receiving section 311 performs a process of acquiring a model image from the imaging section 201 or 206, and of registering various pieces of measurement setting information for performing dimension measurement in the storage device 33.

The imaging control section 313 controls the imaging sections 201 and 206 on the basis of the measurement setting information registered in the storage device 33, and performs switching of the imaging magnification, and adjustment of the imaging timing and the exposure time. The illumination control section 314 performs on/off control on the transmitted illumination unit 25, the coaxial epi-illumination light source 209, the ring illumination unit 211, and the probe light source 263 on the basis of the measurement setting information registered in the storage device 33. For example, when switching is performed from image measurement to probe measurement, the illumination control section 314 turns on the probe light source 263, and turns off the transmitted illumination unit 25, the coaxial epi-illumination light source 209, and the ring illumination unit 211.

The measurement control section 315 controls the vertical drive section 22, the horizontal drive section 24, and the switching drive section 27 on the basis of the measurement setting information registered in the storage device 33, acquires a workpiece image Iw from the imaging section 201 or 206, and performs dimension measurement.

<Input Receiving Section 311>

FIG. 6 is a block diagram showing an example configuration of the input receiving section 311 in FIG. 5. The input receiving section 311 includes an imaging and illumination condition designation section 341, an edge extraction region designation section 342, a contact position designation section 343, a measurement setting section 344, a design value/tolerance designation section 345, and a characteristic amount information setting section 346.

The imaging and illumination condition designation section 341 designates, based on an instruction from a user, imaging conditions such as imaging magnification, the exposure time and a gain, and illumination conditions such as an illumination type, brightness and the height of the ring illumination unit, and registers the conditions in the storage device 33 as the measurement setting information.

The edge extraction region designation section 342 designates, based on an instruction from a user, an edge extraction region on a model image as characteristic amount information, such as a coordinate value relative to a pattern image, and registers the same in the storage device 33 as edge extraction region information.

The contact position designation section 343 receives, on a model image displayed by the display section 21, designation of contact target position information indicating a plurality of contact target positions on a side surface of a workpiece W where the probe 26 should contact. That is, the contact position designation section 343 designates contact target position information that determines a probe operation for causing the probe 26 to contact a plurality of contact target positions where the probe 26 should contact as coordinate values relative to characteristic amount information (pattern image), and registers the information in the storage device 33. The contact target position information includes a contact target position, a scan operation start position, and a scan operation end position.

The contact target position includes position coordinates relative to a pattern image (search data) registered on a model image, and a measurement height indicating the height of a side surface of a workpiece where the probe 26 should contact. The measurement height is designated by a user in advance, for example.

The measurement setting section 344 identifies a contact position of the probe 26 and a workpiece W present in a model image by extracting edges of the workpiece W present in the model image from the edge extraction region designated by the edge extraction region designation section 342, and causing the probe 26 to contact a contact target position and capturing an image of the probe 26, and identifies, from the model image, a contour line as a reference for measurement or a reference point based on the edges or the contact position. A measurement element (such as a straight line, a circle, or an arc) is identified based on the contour line or the reference point which has been identified. Additionally, in the case where the characteristic amount information is CAD data, the contour line or the reference point is directly identified without performing edge extraction.

Based on an instruction from a user, the measurement setting section 344 selects an element which is to be taken as the target of measurement, from measurement elements identified by the process described above, and registers the element as measurement position information in the storage device 33. A measurement element may also be identified based on an auxiliary line (point) that is newly created from a contour line or a reference point which has been identified. An auxiliary line (point) may be an intersection of two contour lines or the center of a circle, for example. The measurement setting section 344 may further designate, as a measurement target, a radius or a diameter, if the selected measurement element is a circle or an arc, or the distance between straight lines, if two straight lines are selected, for example.

Based on an instruction from a user, the design value/tolerance designation section 345 designates a design value and a tolerance to be used for determining the quality, and registers the same in the storage device 33 as the measurement setting information.

The characteristic amount information setting section 346 sets characteristic amount information for identifying the position and the attitude of a workpiece W from a workpiece image captured by the imaging section 201 or 206 at the time of execution of measurement. That is, the characteristic amount information setting section 346 sets characteristic amount information containing search data for identifying the position and the attitude of a workpiece W on the basis of a model image, based on an instruction from the user, and registers the same in the storage device 33 as measurement setting information. For example, the characteristic amount information is a pattern image (data) for normalized correlation search, and is set based on a master piece image of a master piece. The storage device 33 stores the pattern image set by the characteristic amount information setting section 346 and the contact target position information designated by the contact position designation section 343 on the same coordinate system.

A pattern image may be registered by a user designating a highly characteristic position on the model image, or the entire image may be automatically registered as a pattern image. Also, a pattern image may be automatically registered by extracting a characteristic portion from the model image.

By matching a registered pattern image and a workpiece image of an examination target workpiece W, the position and the attitude (coordinates) of the workpiece W in the workpiece image may be identified. A known matching technique such as normalized correlation search and geometric search may be used for matching. Additionally, if the model image is a CAD image, the characteristic amount information may be designated based on the CAD data.

As described above, according to the present embodiment, contact target position information for the probe 26 and the edge extraction region are designated as coordinate values relative to a pattern image (search data) registered on a model image. The contact target position information contains a contact target position, which is a target position where the probe 26 is to contact, a scan operation start position, which is the position where a scan operation is to be started, a scan operation end position, which is the position where the scan operation is to end, a measurement height indicating the height of a side surface of a workpiece where contact should be made, and the like.

Contact target positions of the probe 26 and the edge extraction region may be automatically identified by a user placing an examination target workpiece W on the stage 23 and acquiring a workpiece image, and by performing a matching process using a pattern image (search data). By causing the probe 26 to sequentially contact a side surface of the workpiece according to the contact target positions which have been identified, the contour line of the workpiece W is identified. Additionally, to identify a straight contour line, coordinate information of two or more contact positions is necessary, and to identify a circular or arc-shaped contour line, coordinate information of three or more contact positions is necessary. Additionally, two or more contact positions are not necessarily required, and in the case where measurement is to be performed for a specific point, coordinate information of the contact position at the one point may be used for measurement.

The input receiving section 311 receives designation of a measurement element which is to be measured by the probe 26, on the model image displayed by the display section 21. The model image being displayed by the display section 21 is a workpiece image of a workpiece W for measurement setting. An arrangement rule defining the relationship between the shape type or the size of a measurement element that can be designated by the input receiving section 311 and arranged positions of contact target positions of the probe 26 is stored in advance in the storage device 33. The arrangement rule is information for appropriately designating contact target positions according to the shape type or the size of the measurement element. For example, the arrangement rule is a table, a function or an arithmetic expression associating with the shape type or the size of a measurement element and the number of contact target positions.

In the case where the shape type of a measurement element is a circle or an arc, the arrangement rule is determined such that three or more contact target positions are arranged at regular intervals in the circumferential direction of the circle or the arc. Also, in the case where the shape type is a straight line, the arrangement rule is determined such that two or more contact target positions are arranged at regular intervals in the direction of the straight line.

At the time of execution of measurement, the measurement control section 315 identifies the contact target positions of the probe according to the position of the measurement element designated by the input receiving section, the shape type or the size of the measurement element, and the arrangement rule stored in the storage section, and controls the horizontal drive section such that the probe sequentially moves to the plurality of contact target positions which have been identified.

When an edge extraction region is set on a measurement element, the contact position designation section 343 extracts an edge from the edge extraction region and determines a contour line with respect to the model image being displayed, and designates a plurality of contact target positions on the contour line, and also, designates a start position of a scan operation where the probe 26 is to approach at a position separated from a contact target position in the normal direction of the contour line.

A symbol indicating the start position of the scan operation is displayed on the model image by the display section 21, and the contact position designation section 343 receives a user operation for changing the start position of the scan operation, the number of contact target positions on the contour line, and information about the scan direction and the height where the probe 26 is to approach.

Figure 7A:
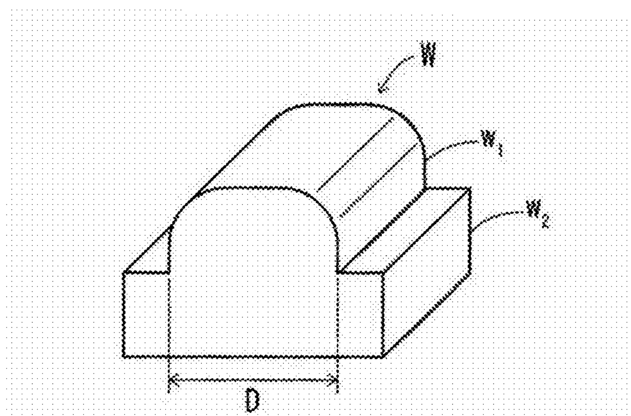
FIGS. 7A to 7D are diagrams showing examples of operation at the time of contact position designation at the input receiving section in FIG. 5.

FIGS. 7A to 7D are diagrams showing examples of operation at the time of contact position designation at the input receiving section 311 in FIG. 5. FIG. 7A shows a workpiece W for which a pattern image Ip and contact target position information are to be registered. The workpiece W is curved on both outsides of a protruding portion $w_2$, which is formed on a base member $w_1$, and a distance D between side surfaces of the protruding portion $w_2$ is measured by using the probe 26.

A model image Im is a reflection image captured by reflected illumination, and a partial region including the workpiece W is registered as the pattern image Ip. The pattern image Ip and the contact target position information may be associated with each other in three ways as indicated in FIGS. 7B to 7D described below, for example.

Figure 7B:
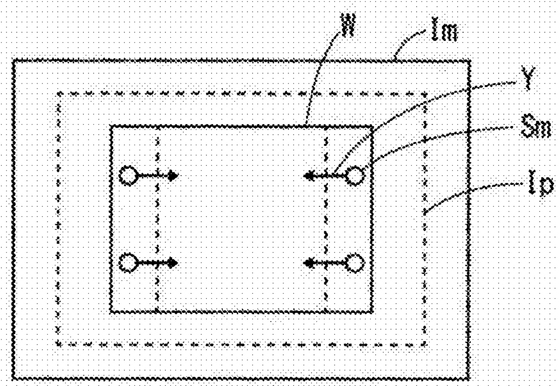

FIG. 7B shows a case where the pattern image Ip and the contact target positions are directly associated. For example, by designating a start position and an end position of a scan operation in the pattern image Ip, contact target positions are automatically identified. The start position and the end position may be designated by moving a symbol Sm indicating the probe 26 or an arrow Y indicating the scan direction by mouse operation. Additionally, the start position and the end position of the scan operation may be automatically determined by designating the contact target positions. By directly associating the pattern image Ip and the contact target positions in this manner, the contact target position coordinates are stored relative to the pattern image (search data).

Figure 7C:
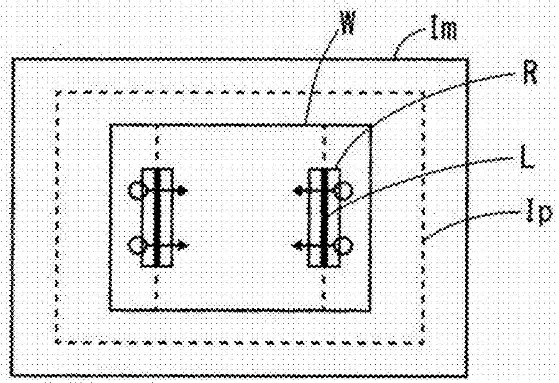

FIG. 7C shows a case where a contour line L, which is identified by extracting an edge from an edge extraction region R, and contact target positions are associated. Edge points are extracted from the edge extraction region R designated in the pattern image Ip, and a contour line L fitting a sequence of extracted edge points is identified. By designating contact target positions on the contour line L, the pattern image Ip and the contact target positions are indirectly associated. Position coordinates of the edge extraction region R on a workpiece image which is input at the time of examination are automatically identified by matching the workpiece image and the pattern image (search data). A series of edge points in the edge extraction region R, the position of which has been identified, are extracted, and contact target positions are set at positions determined in advance for the contour line L which is identified from the sequence of edge points. For example, if the scan direction is set such that approach is made from a position separated from the contour line L by a predetermined distance in the normal direction, approach can be stably made along the normal line of the contour line L, and measurement can be stabilized.

Figure 7D:
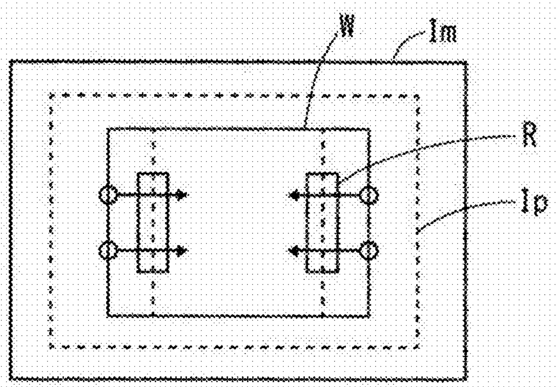

FIG. 7D shows a case where the edge extraction region R and contact target positions are associated. By designating contact target positions in the edge extraction region R designated in the pattern image Ip, the pattern image Ip and the contact target positions are indirectly associated. Contact target position coordinates are identified at the same time as identification of position coordinates of the edge extraction region R by the matching process described above.

FIG. 8 is a diagram showing an example of operation at the time of pattern image registration at the input receiving section 311 in FIG. 5, and shows a model image Im obtained by capturing an image of the workpiece W shown in FIG. 7A by transmitted illumination. A part of the model image Im is registered as a pattern image Ip for search. In this manner, a transmission image captured by transmitted illumination is used for the pattern image Ip for search, while a reflection image captured by reflected illumination is used for designation of a contact target position.

In general, with a transmission image, which is captured by transmitted illumination, a clear edge may be obtained, and also, a change in the image due to a change in the ambient environment is small. Accordingly, a pattern image is registered based on a transmission image, which is captured by transmitted illumination, and meanwhile, designation of a contact target position of the probe 26 may be performed based on a reflection image, which is captured by reflected illumination, in order to measure the contour of the inside, which cannot be acquired by transmitted illumination, of the shape of a workpiece which does not allow penetration. In this manner, the illumination conditions for registering a pattern image and illumination conditions for registering a contact target position or an edge extraction region may be made different. Also, to make the illumination conditions for successive measurement the same as the illumination conditions at the time of setting, the illumination conditions at the time of setting are registered as measurement setting information.

By matching a pattern image (search data) registered in a model image Im at the time of setting and a workpiece image input at the time of examination, a contact target position is directly or indirectly identified. When a position to be scanned by the probe 26 is identified, an operation plan is determined for the probe 26, and the measurement control section 315 controls the operation of the probe 26.

FIGS. 9A and 9B are diagrams showing examples of operation at the time of contact position designation at the input receiving section 311 in FIG. 5, and show tables associating with a shape type and the number of scan paths. FIG. 9A shows a table for a case where the number of division is fixed. This table is a standard for arrangement associating with a shape type of a measurement target and the number of scan paths, and specifies the number of scan paths and the number of division for three shape types (a straight line, a circle, and an arc).

Specifically, in the case where the shape type is a straight line, the number of division is three, and two scan paths are arranged so as to equally divide the straight line into three. Also, in the case where the shape type is a circle, the number of division is three, and three scan paths are arranged so as to equally divide the circumference into three. In the case where the shape type is an arc, the number of division is four, and three scan paths are arranged so as to equally divide the arc into four.

FIG. 9B shows a table for a case where the number of division may be varied according to the size of a measurement target. This table is a standard for arrangement associating with a shape type and a size of a measurement target, and the number of scan paths, and specifies the number of scan paths for three shape types (a straight line, a circle, and an arc).

Specifically, in the case where the shape type is a straight line, if the length of a contour line L is below a threshold TH, the number of division is three, and two scan paths are arranged so as to equally divide the straight line into three. On the other hand, if the length of the contour line L is at or above the threshold TH, the number of division is four, and three scan paths are arranged so as to equally divide the straight line into four. Also, in the case where the shape type is a circle, if the length of the contour line L is below the threshold TH, the number of division is three, and three scan paths are arranged so as to equally divide the circumference into three. On the other hand, if the length of the contour line L is at or above the threshold TH, the number of division is four, and four scan paths are arranged so as to equally divide the circumference into four. In the case where the shape type is an arc, if the length of the contour line L is below the threshold TH, the number of division is four, and three scan paths are arranged so as to equally divide the arc into four. On the other hand, if the length of the contour line L is at or above the threshold TH, the number of division is five, and four scan paths are arranged so as to equally divide the arc into five.

Figure 10A:
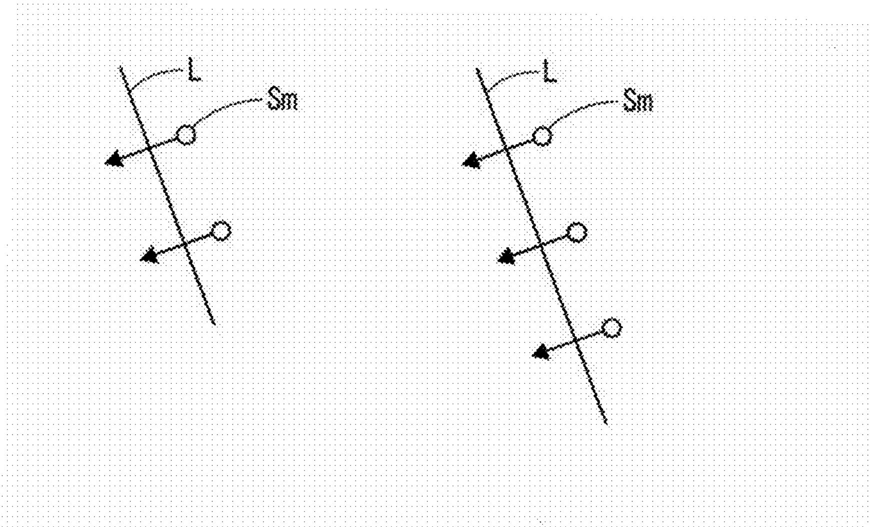
FIGS. 10A and 10B are diagrams showing examples of operation at the time of scan position designation at the input management section in FIG. 5, and show cases where the number of scan paths is different depending on the length of a contour line.
Figure 10B:
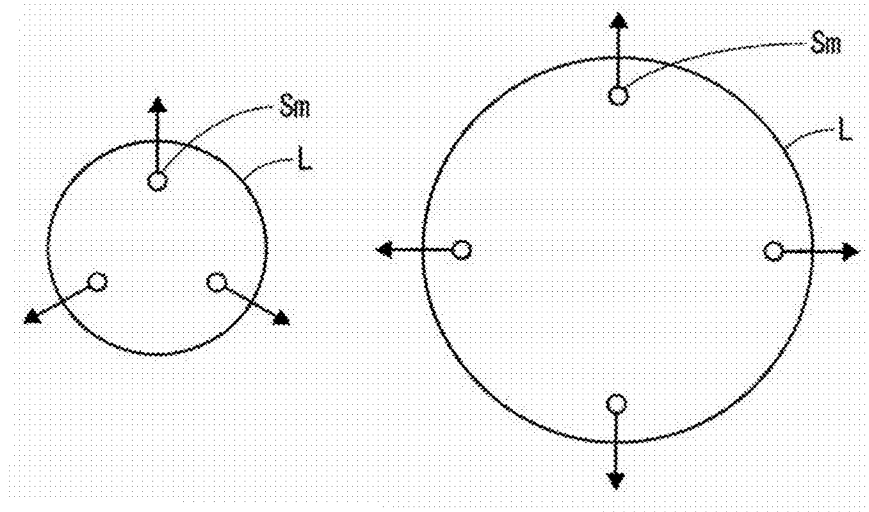

FIGS. 10A and 10B are diagrams showing examples of operation at the time of contact position designation at the input receiving section 311 in FIG. 5, and show cases where the number of scan paths is different depending on the length of the contour line L. FIG. 10A shows a case where the shape type is a straight line, and FIG. 10B shows a case where the shape type is a circle.

When an edge extraction region R is designated by a user as a measurement target region in a model image Im, contact target positions are designated on a contour line L which is identified by extraction of an edge from the edge extraction region R. For example, the contact target positions are designated at regular intervals from an end point of the contour line L. If the shape type of the contour line L is a straight line, two or more contact target positions are designated, and if the shape type of the contour line L is a circle or an arc, three or more contact target positions are designated. In this case, the number of contact target positions which are designated on the contour line L is different depending on the length of the contour line L. Additionally, the contour line L may be directly designated by mouse operation or the like.

Also, like the scan paths illustrated, n or (n−1) scan paths that equally divide the contour line L may be designated by designating the number of division n of three or more. Specifically, as shown in FIG. 10A, in the case where the shape type of the contour line L is a straight line, if the length of the contour line L is below a specific value, the number of division is three, and two scan paths that equally divide the contour line L are designated. On the other hand, if the length of the contour line L is at or above the specific value, the number of division is four, and three scan paths that equally divide the contour line L are designated.

Moreover, as shown in FIG. 10B, in the case where the shape type is a circle, if the radius is below a specific value, the number of division is three, and three scan paths that equally divide the contour line L are designated. On the other hand, if the radius is at or above the specific value, the number of division is four, and four scan paths that equally divide the contour line L are designated.

A position which is separated from a contact target position by a specific distance in a direction perpendicular to the contour line L is designated as the start position of a scan path. A position opposite the start position across the contour line L is designated as the end position of the scan path. Furthermore, the scan direction of bringing the probe 26 close to a side surface of the workpiece W is determined based on the difference in brightness between both ends of an edge extracted from a model image Im. Additionally, the method of determining the start position and the end position of a scan path is not limited to the method described above. It is sufficient if the start position and the end position of a scan path are relatively determined with respect to a contact target position.

<Measurement Control Section 315>

Figure 11:
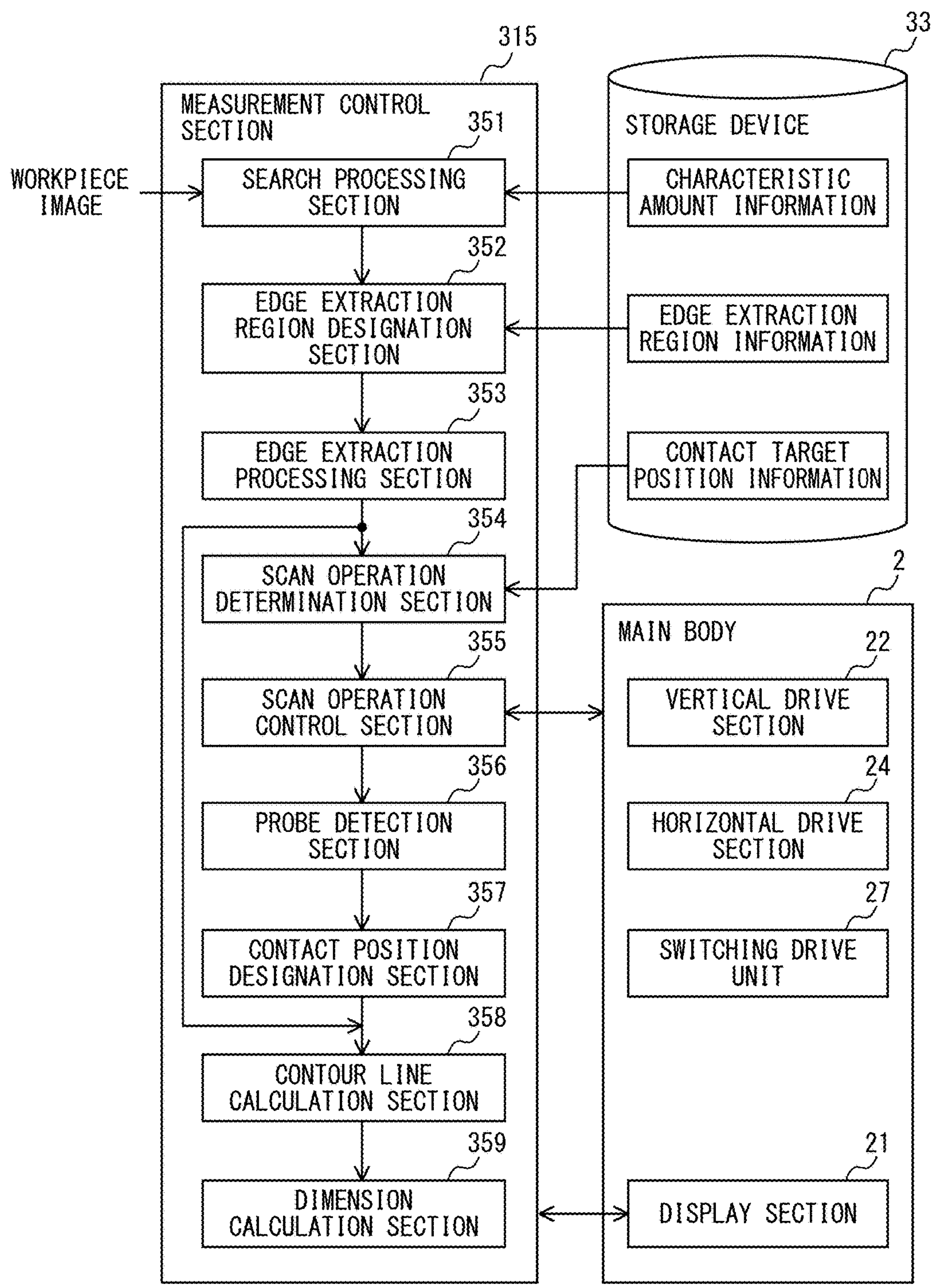
FIG. 11 is a block diagram showing an example configuration of a measurement control section in FIG. 5.

FIG. 11 is a block diagram showing an example configuration of the measurement control section 315 in FIG. 5. The measurement control section 315 includes a search processing section 351, an edge extraction region identification section 352, an edge extraction processing section 353, a scan operation determination section 354, a scan operation control section 355, a probe detection section 356, a contact position identification section 357, a contour line calculation section 358, and a dimension calculation section 359.

The search processing section 351 acquires a workpiece image from the imaging section 201 or 206, and identifies the position and the attitude of a workpiece W, based on the characteristic amount information in the storage device 33. Identification of the position and the attitude is performed by pattern search. The search processing section 351 acquires a workpiece image that is generated in a state where the probe 26 is at the retracted position outside the imaging field of view, and identifies the position and the attitude of the workpiece W from the workpiece image.

The edge extraction region identification section 352 identifies an edge extraction region in the workpiece image, based on the position and the attitude of the workpiece W identified by the search processing section 351 and edge extraction region information. The edge extraction processing section 353 extracts edge points from the edge extraction region identified by the edge extraction region identification section 352.

The scan operation determination section 354 determines a scan operation by identifying the position of a contour line by fitting a geometric figure which is designated in advance as a shape type with the plurality of edge points extracted by the edge extraction processing section 353, and by identifying the start position and the scan direction based on contact target position information.

The scan operation control section 355 controls the vertical drive section 22, the horizontal drive section 24, and the switching drive section 27 of the main body 2 according to the scan operation determined by the scan operation determination section 354. For example, the scan operation control section 355 controls the switching drive section 27 to switch the probe 26 from the retracted position to the measurement position, and then, controls the horizontal drive section 24 so that the probe 26 sequentially moves to a plurality of contact positions.

The probe detection section 356 detects contact of the probe 26 with a side surface of the workpiece W. For example, workpiece images are repeatedly acquired from the imaging section 201 or 206, and if a change in the position, in the workpiece images, of the probe 26 which is moving along the scan path reaches or exceeds a specific threshold within a specific period of time, the probe 26 is determined to have contacted a side surface of the workpiece W. Additionally, a sensor for detecting physical contact may be provided to the probe 26.

When contact of the probe 26 with a side surface of the workpiece W is detected, the contact position identification section 357 acquires a captured workpiece image with the probe 26 which is in contact with the side surface of the workpiece W, and identifies the contact position, based on the position of the probe 26 in the workpiece image. A plurality of contact positions where the probe 26 contacted the workpiece W are identified based on the positions of the probe 26 in workpiece images and the relative position of the imaging field of view with respect to the stage 23.

The relative position of the imaging field of view with respect to the stage 23 is input from the horizontal drive section 24. Each contact position is determined from position coordinates of the imaging field of view in a global coordinate system (the relative position of the camera 200 or the stage 23) input from the horizontal drive section 24 and coordinates of each contact position in a local coordinate system in the imaging field of view.

Additionally, in the present embodiment, the camera 200 and the probe 26 do not operate in the XY direction, and the probe 26 and a side surface of a workpiece W are to come into contact by the stage 23 moving in the XY direction. Accordingly, in a state where the probe 26 is not in contact with the workpiece W, the probe 26 is constantly positioned at the center of the imaging field of view. Such an example is not restrictive, and the camera may move together with the probe 26, or the probe 26 may move in the imaging field of view.

The contour line calculation section 358 identifies the position of a contour line by fitting a geometric figure with a plurality of edge points extracted by the edge extraction processing section 353 or a plurality of contact positions identified by the contact position identification section 357.

The dimension calculation section 359 determines a dimension of the workpiece W, based on the position of the contour line identified by the contour line calculation section 358, and displays the measurement result by the display section 21. The dimension calculation section 359 determines a dimension of the workpiece W by using one or both of a contour line identified by extracting an edge from an edge extraction region and a contour line identified by the probe 26 coming into contact.

For example, a dimension may be determined by combining the contour line identified by edge extraction and the contour line identified by the probe 26 coming into contact. By adopting such a configuration, dimension measurement may be performed by identifying, by contact of the probe 26, a contour line at a measurement position where an edge cannot be accurately extracted, and by identifying, by edge extraction, a contour line at a measurement position where an edge can be accurately extracted. That is, regarding a part where measurement can be performed based on an image, time required for dimension measurement can be reduced by performing measurement based on the image.

Figure 12:
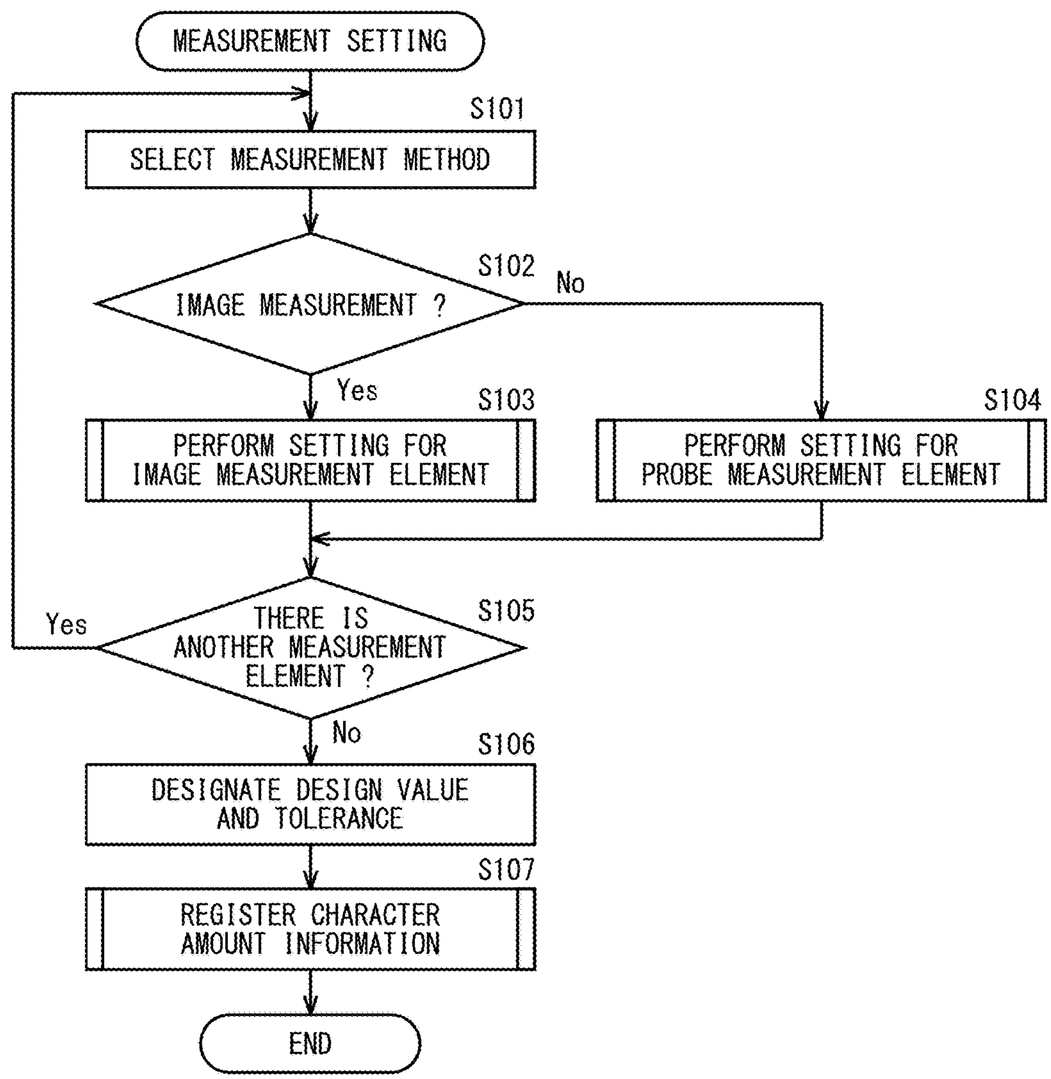
FIG. 12 is a flowchart showing an example of operation at the time of measurement setting at the controller in FIG. 5.

FIG. 12 is a flowchart showing, in steps S101 to S107, an example of operation at the time of measurement setting at the controller 3 in FIG. 5. First, when one of measurement methods, image measurement and probe measurement, is selected by a user (step S101), the controller 3 performs setting of a measurement element according to the selected measurement method (steps S102 to S104).

Figure 13A:
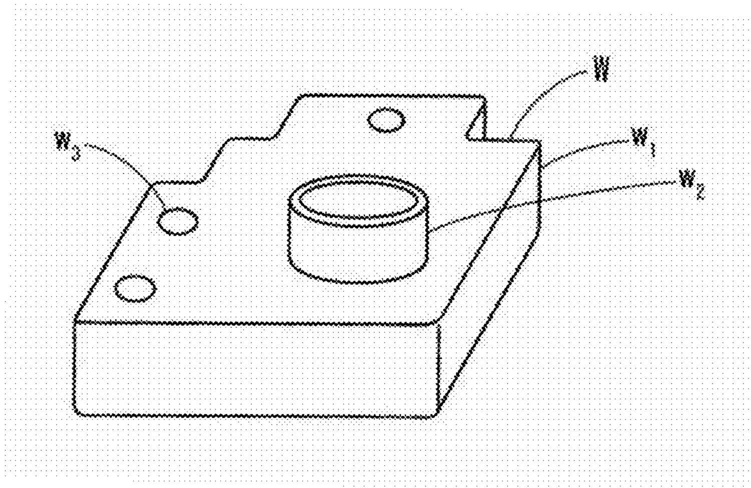
FIGS. 13A and 13B are diagrams showing an example of operation at the time of measurement setting at the image measurement device in FIG. 1, and show a workpiece which is a registration target and a pattern image.
Figure 13B:
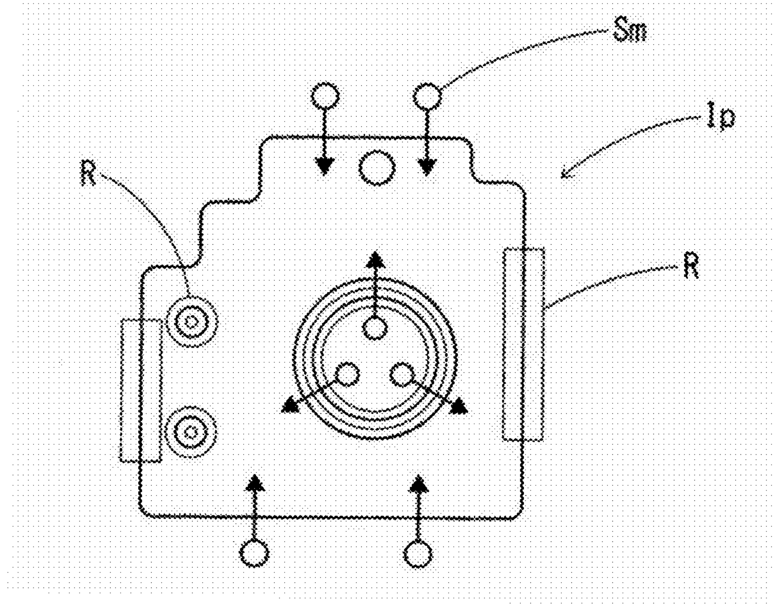
Figure 14:
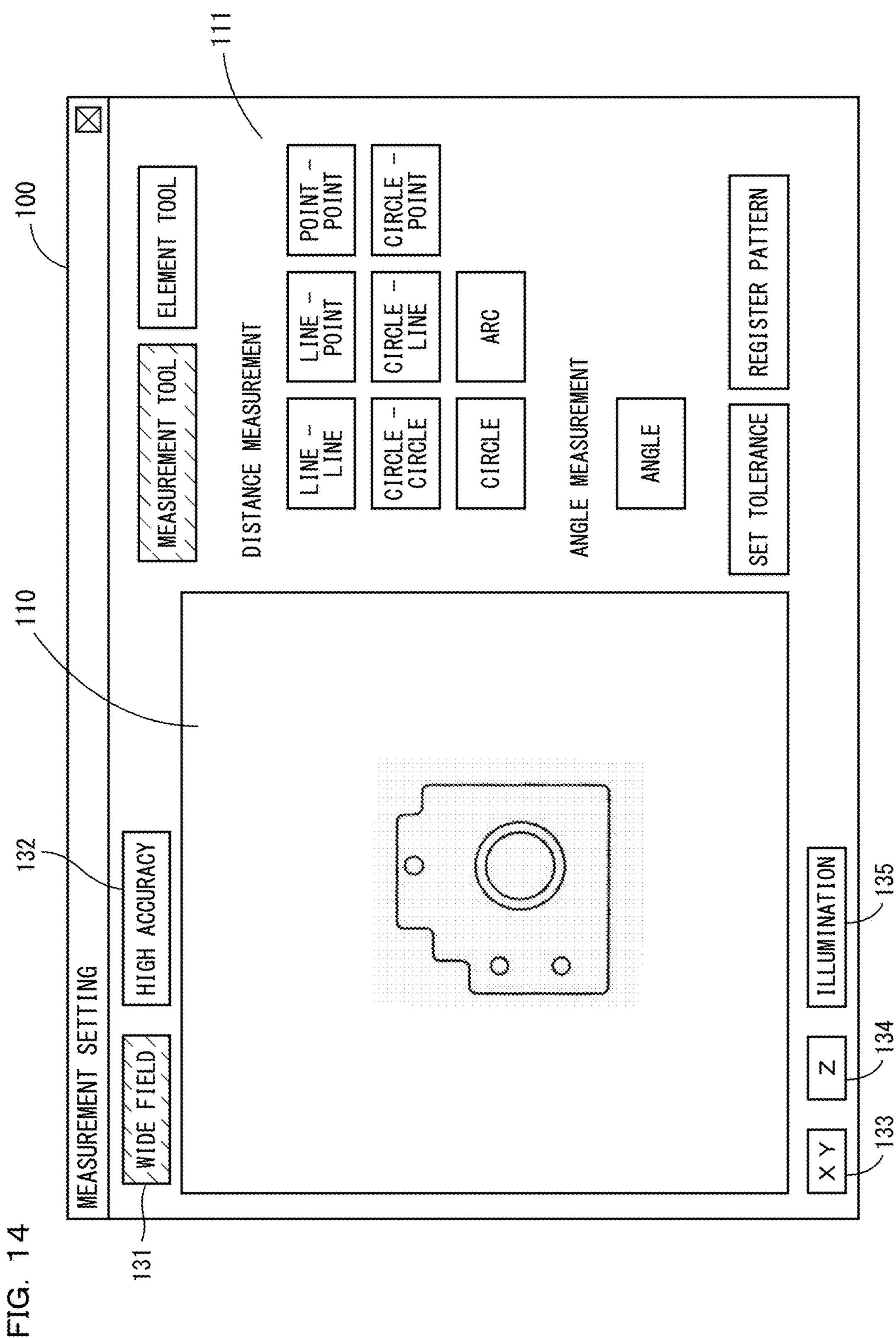
FIG. 14 is a diagram showing an example of operation at the time of measurement setting at the image measurement device in FIG. 1, and shows a setting screen that is displayed by a display section.

FIGS. 13A and 13B and FIG. 14 are diagrams showing an example of operation at the time of measurement setting at the image measurement device 1 in FIG. 1. FIG. 13A shows a workpiece W which is a registration target, and FIG. 13B shows edge extraction regions R designated in a pattern image Ip and symbols Sm indicating the start positions of a scan operation. The workpiece W has a cylindrical protruding portion $w_2$ formed on a base member $w_1$, and three through holes $w_3$ formed at a peripheral edge portion of the base member $w_1$.

The pattern image Ip is a captured image of a workpiece W as a subject. As measurement positions, a distance between left and right side surfaces of the base member $w_1$, a distance between front and rear side surfaces, a distance between two through holes $w_3$, and an inner diameter of the protruding portion $w_2$ are designated. The distance between the left and right side surfaces of the base member $w_1$, and the distance between two through holes $w_3$ are measured by extracting edges from edge extraction regions R designated with respect to a contour line of the workpiece W. On the other hand, the distance between the front and rear side surfaces of the base member $w_1$, and the inner diameter of the protruding portion $w_2$ are measured by contact of the probe 26.

FIG. 14 shows a setting screen 100 which is displayed by the display section 21 at the time of designation of measurement setting information. The setting screen 100 is an edit screen for measurement setting information, and includes a display field 110 for displaying a model image, and a menu field 111 used for selection of a dimension type.

The model image being displayed in the display field 110 is a captured image of the workpiece W shown in FIG. 12 as a subject. Low magnification for wide field measurement or high magnification for high accuracy measurement may be designated as the imaging magnification, by operating a magnification button 131 or 132. Also, the positions of the stage 23 in the X direction and the Y direction may be adjusted by operating a stage adjustment button 133. Moreover, the position of the measurement unit 20 in the Z direction may be adjusted by operating a Z adjustment button 134. An illumination type may be designated by operating an illumination button 135. The illumination type may be transmitted illumination, ring illumination, coaxial epi-illumination, or the like.

The dimension types in the menu field 111 include distance measurement, angle measurement, and the like. Distance measurement may be measurement of a distance between two straight lines, measurement of a distance between a straight line and a point, measurement of a distance between two points, measurement of a distance between two circles, measurement of a distance between a circle and the straight line, measurement of a distance between a circle and a point, measurement of a diameter of a circle, and measurement of a radius of an arc.

In the setting of an image measurement element in step S103, measurement setting information is designated for a measurement element for which dimension measurement is to be performed by edge extraction. On the other hand, in the setting of a probe measurement element in step S104, measurement setting information is designated for a measurement element for which dimension measurement is to be performed by contact of the probe 26. The processing contents of steps S103 and S104 will be described in detail with reference to FIGS. 17 and 19, respectively. The controller 3 repeats the processing procedure from steps S101 to S104 until setting is complete for all the measurement elements in the model image (step S105).

Next, the controller 3 designates a design value and a tolerance (step S106). In this step, a dimension value calculated from the model image is displayed in association with a contour line of a measurement element, and when a dimension value in the model image is selected by the user, a design value or a tolerance may be newly designated or changed.

Figure 15:
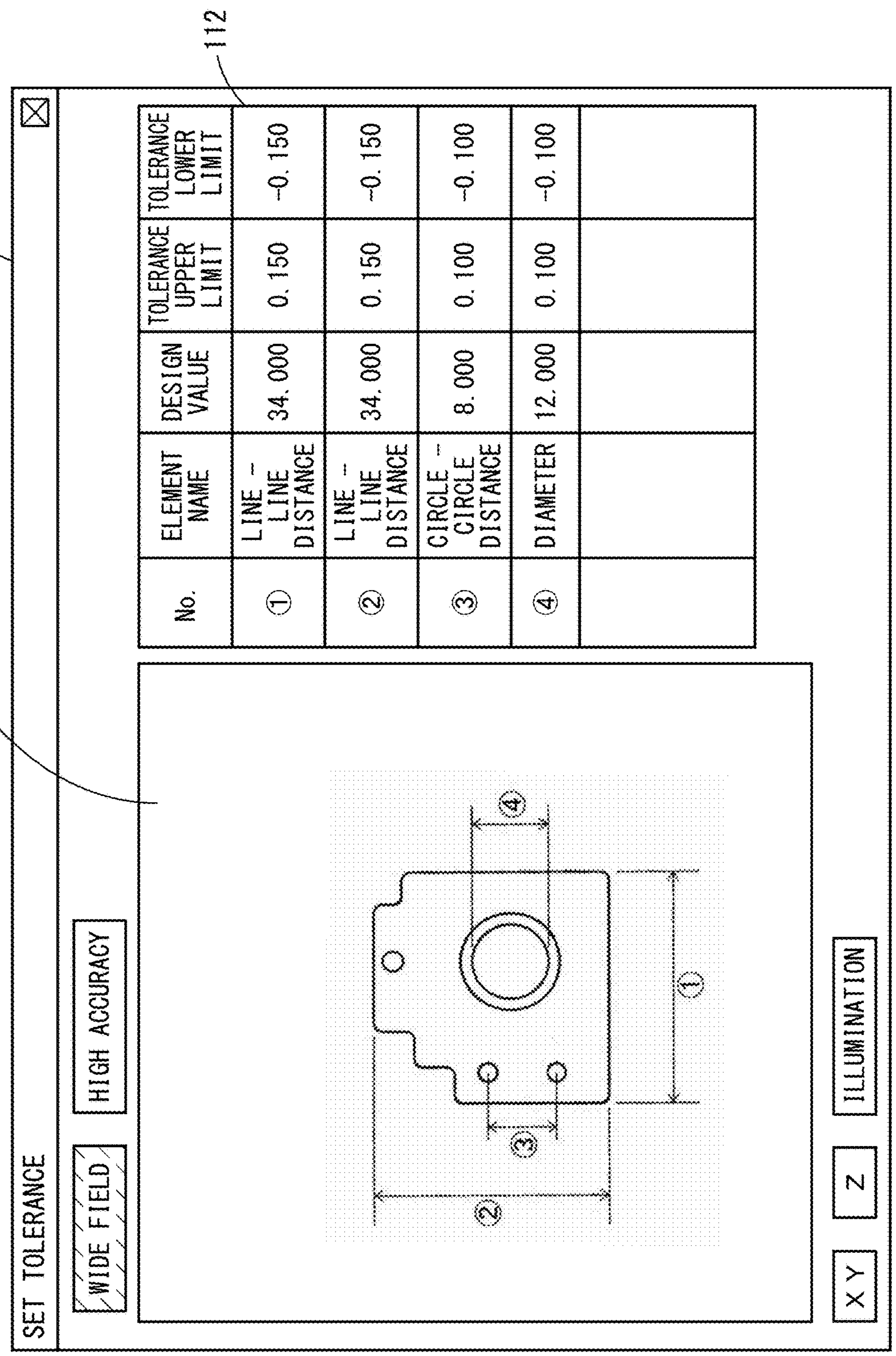
FIG. 15 is a diagram showing a tolerance setting screen that is used at the time of designation of a design value and a tolerance.

FIG. 15 shows a tolerance setting screen 101 for designation of a design value and a tolerance. The tolerance setting screen 101 is an edit screen for a design value and a tolerance, and includes the display field 110 for displaying a model image, and an input field 112 for designating a design value and an upper limit value and a lower limit value of a tolerance. A dimension line or an identification number is displayed in the model image being displayed in the display field 110 in association with a measurement position.

Design values and upper limit values and lower limit values of tolerances are displayed in the input field 112 for a plurality of measurement positions which are registered as measurement setting information, and when a measurement position is selected, the design value, or the upper limit value or the lower limit value of the tolerance may be newly designated or changed.

Next, the controller 3 registers characteristic amount information (step S107). In this step, a pattern image (search data) for identifying the position and the attitude of the workpiece W is registered, by using the model image, together with a relative positional relationship between the pattern image and an edge extraction region designated in the setting of each measurement element.

Figure 16:
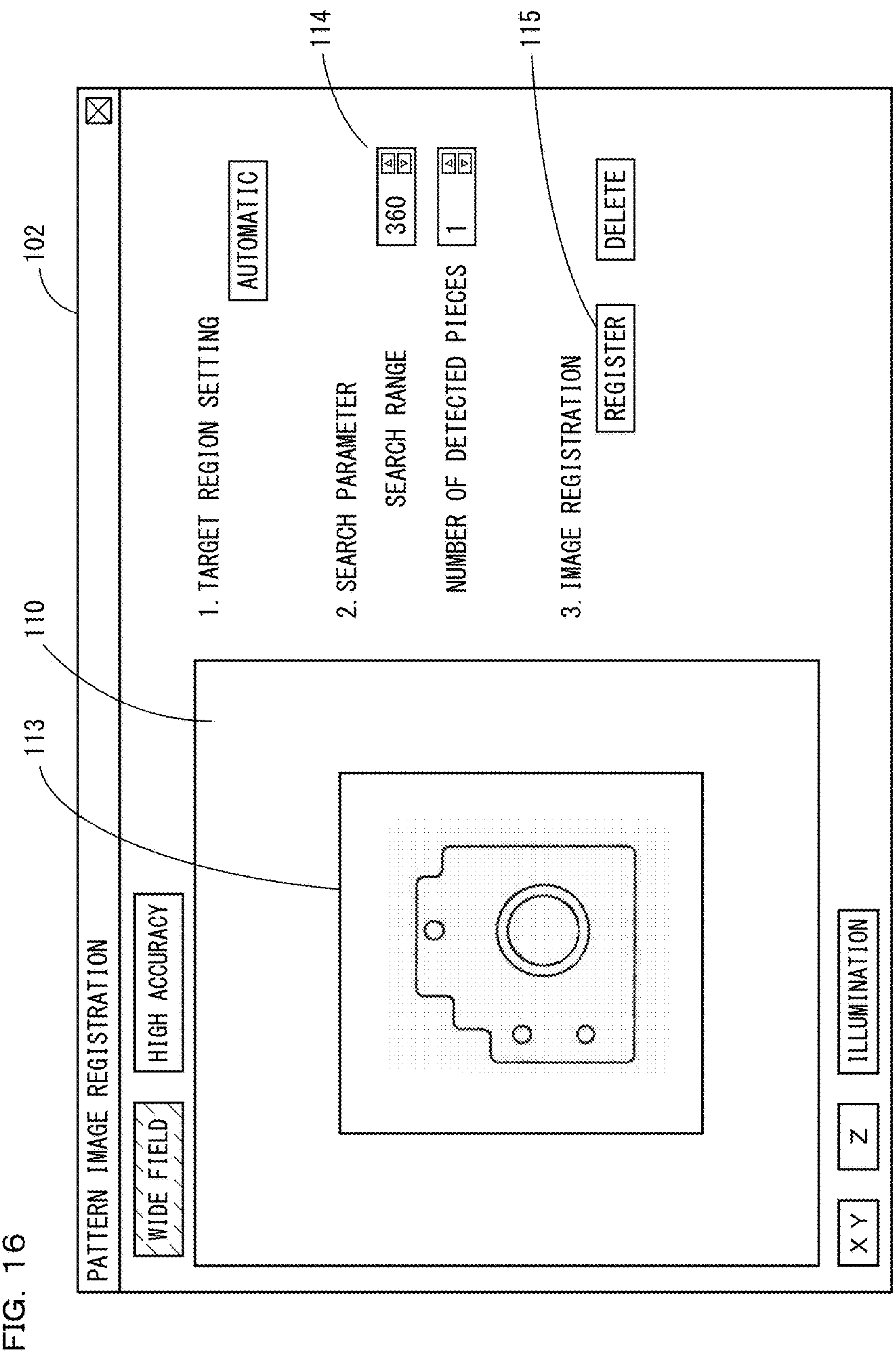
FIG. 16 is a diagram showing a characteristic amount setting screen that is used at the time of designation of characteristic amount information.

FIG. 16 shows a characteristic amount setting screen 102 for designation of characteristic amount information. The characteristic amount setting screen 102 is an edit screen for registering a pattern image as characteristic amount information, and includes the display field 110 for displaying a model image, and an input field 114 for designating a registration target region and search conditions. A frame 113 showing an outer edge of the registration target region is displayed for the model image being displayed in the display field 110.

As the search conditions, a search range for limiting the scan range in the rotation direction, and the number of detected workpieces W matching the pattern image may be designated. The model image being displayed is registered as the pattern image for search by operating a register button 115.

Figure 17:
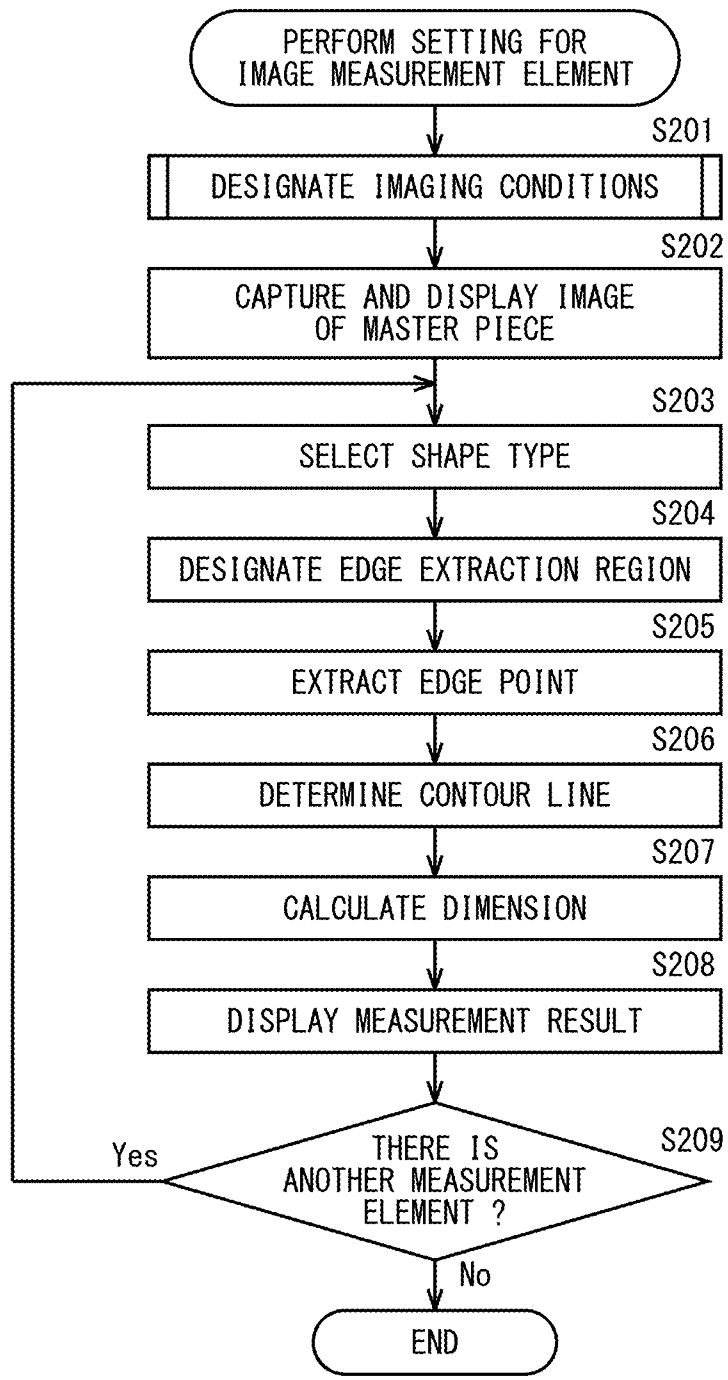
FIG. 17 is a flowchart showing an example of detail operation of step S103 (setting of image measurement element) in FIG. 12.

FIG. 17 is a flowchart showing, in steps S201 to S209, an example of detailed operation of step S103 (setting of image measurement element) in FIG. 12, and shows an operation of the controller 3. First, the controller 3 designates imaging conditions described below (step S201), and acquires, and displays as the model image, a captured image of a master piece that is placed on the stage 23 (step S202).

Next, the shape type of a measurement element is selected by the user (step S203), and an edge extraction region is designated by the user according to the shape type (step S204). The controller 3 extracts a plurality of edge points from the designated edge extraction region (step S205), fits a geometric figure according to the selected shape type with the edge points, and thereby determines the position of the contour line (step S206).

Next, the controller 3 calculates a dimension of the measurement position based on the position of the contour line, and displays the dimension value which is the measurement result on the model image in association with the measurement element (steps S207, S208). The controller repeats the processing procedure from steps S203 to S208 until setting is complete for all the measurement elements in the model image (step S209).

Figure 18A:
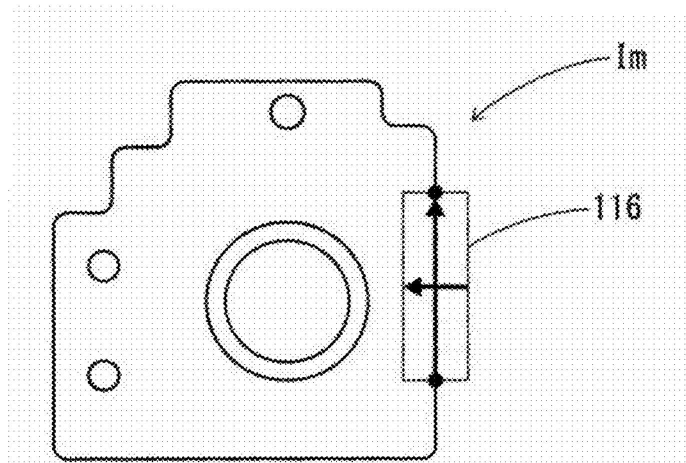
FIGS. 18A and 18B are diagrams showing an example of operation at the time of setting of an image measurement element at the image measurement device in FIG. 1.
Figure 18B:
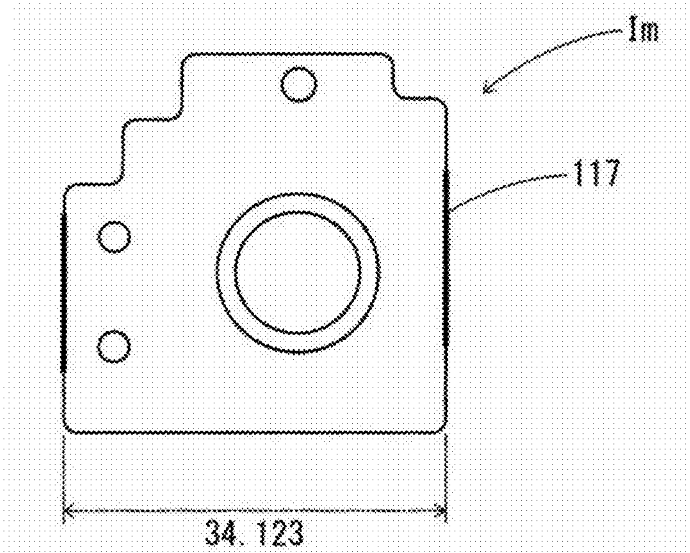

FIGS. 18A and 18B are diagrams showing an example of operation at the time of setting of an image measurement element at the image measurement device 1 in FIG. 1. FIG. 18A shows an edge extraction region 116 which is designated in a model image, and FIG. 18B shows a contour line 117 which is identified by extracting an edge from the edge extraction region 116.

When positions of a start point and an end point of a measurement element are designated in the model image being displayed in the display field 110 of the setting screen 100, a rectangular region containing a straight line connecting the start point and the end point is automatically designated as the edge extraction region 116, and is displayed in the model image in association with the measurement element, together with the scan direction of the edge points. When registration of the edge extraction region 116 is complete, a dimension value or the contour line 117 identified by extracting an edge from the edge extraction region 116 is displayed in the model image.

Figure 19:
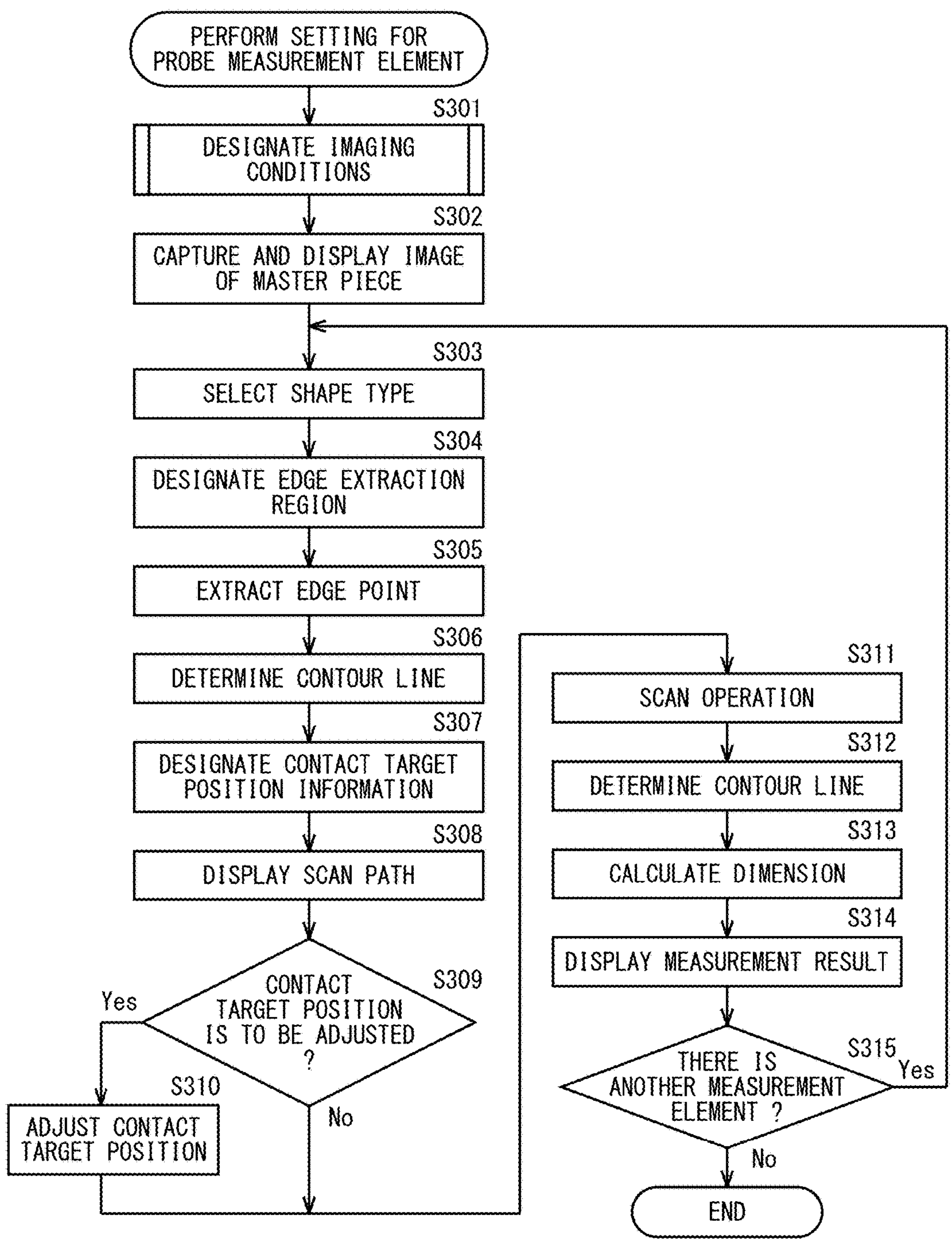
FIG. 19 is a flowchart showing an example of detailed operation of step S104 (setting of probe measurement element) in FIG. 12.

FIG. 19 is a flowchart showing, in steps S301 to S315, an example of detailed operation of step S104 (setting of probe measurement element) in FIG. 12, and shows an operation of the controller 3. The processing procedure from steps S301 to S306 is the same as the processing procedure from steps S201 to S206 in FIG. 17.

Next, the controller 3 designates contact target position information (step S307). The contact target position information, that is, contact target positions and a scan path are automatically designated based on the shape type and the size of the measurement element. Moreover, the designated scan path is displayed superimposed on the model image (step S308).

Figure 20A:
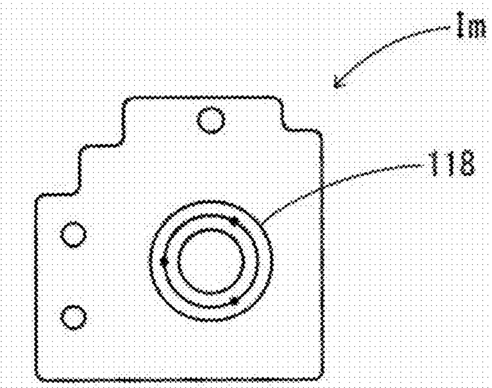
FIGS. 20A to 20C are diagrams showing an example of operation at the time of setting of a probe measurement element at the image measurement device in FIG. 1.
Figure 20B:
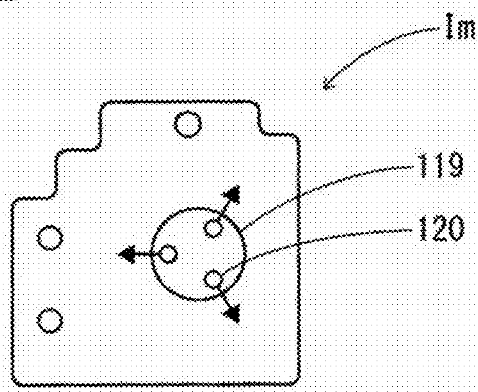
Figure 20C:
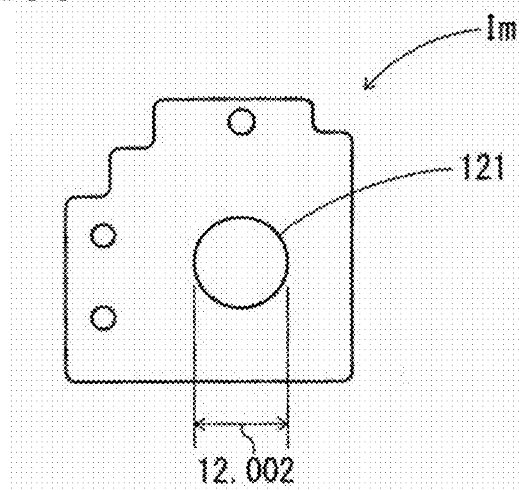

FIGS. 20A to 20C are diagrams showing an example of operation at the time of setting of a probe measurement element at the image measurement device 1 in FIG. 1. Probe measurement is performed by capturing an image of the probe 26 by the camera 200, and thus, it is difficult for the user to determine where the probe 26 should contact the workpiece W, or how the probe 26 should approach a side surface of the workpiece W. With the image measurement device 1 according to the present embodiment, a contact target position is automatically determined simply by designating an edge extraction region as a measurement target region in the model image.

FIG. 20A shows an edge extraction region 118 which is designated in a model image Im. When three points on a circumference of a measurement element is designated in the model image Im being displayed in the display field 110 of the setting screen 100, an annular region including these points is automatically designated as the edge extraction region 118, and is displayed in the model image Im.

FIG. 20B shows a contour line 119 which is identified by extracting an edge in an edge extraction region 118, and symbols 120 indicating start positions of a scan operation. When registration of the edge extraction region 118 is completed, an edge is extracted from the edge extraction region 118, and the position of the contour line 119 is identified. Contact target positions are designated with respect to the contour line 119, and the symbols 120 indicating the start positions of the scan operation are displayed in association with the contour line 119. In this example, three scan paths are arranged at regular intervals along the contour line 119.

A symbol 120 and a workpiece W on the setting screen 100 have similar shapes as the actual contact section 261 and the actual workpiece W. Accordingly, the user is allowed to accurately grasp the positional relationship between the contact section 261 and the workpiece W on the setting screen 100, and may check whether the contact section 261 will interfere with the workpiece W when the probe 26 is operated. Moreover, in the case where the contact section 261 is highly likely to interfere with the workpiece W, an error may be displayed on the setting screen 100 to notify the user to the effect, for example.

FIG. 20C shows a contour line 121 which is identified by contact of the probe 26 and a dimension value which is displayed in association with the contour line 121. When registration of contact target positions is completed, the contour line 121 which is identified by causing the probe 26 to contact a side surface of the workpiece W is displayed in the model image on the setting screen 100, and also, a dimension value which is determined from the contour line 121 is displayed in association with the contour line 121.

Next, the controller 3 inquires of the user whether the scan path is to be adjusted (step S309), and if adjustment of the scan path is indicated by the user, a contact target position is adjusted (step S310).

Figure 21A:
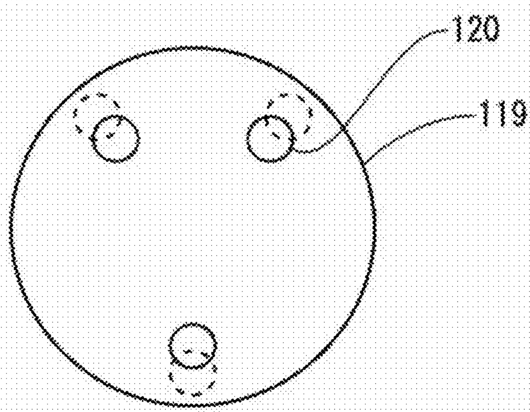
FIGS. 21A to 21C are diagrams showing examples of operation for a case of adjusting target contact positions on a model image.
Figure 21B:
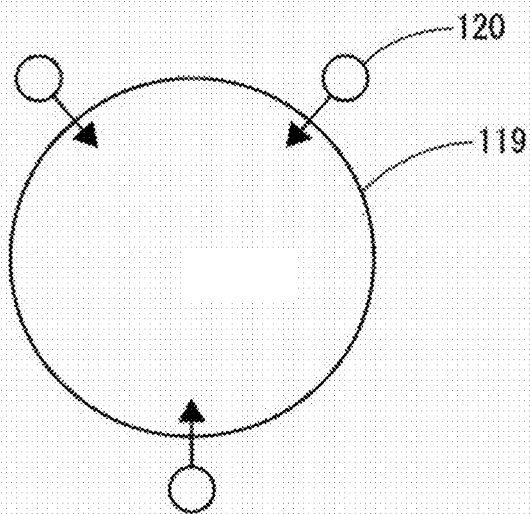
Figure 21C:
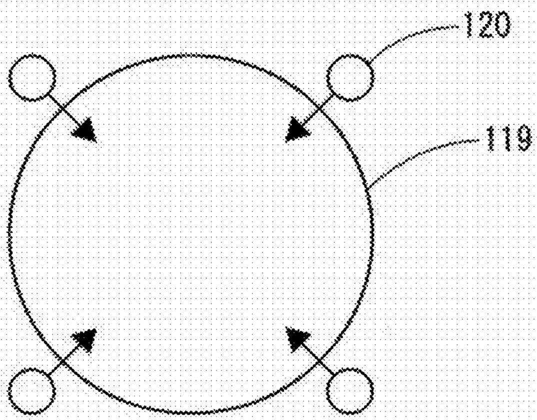

FIGS. 21A to 21C, and FIGS. 22A to 22C are diagrams showing examples of operation at the time of setting of a probe measurement element at the image measurement device 1 in FIG. 1. FIG. 21A shows a case of adjusting contact target positions which are designated with respect to a contour line 119 in the model image Im, FIG. 21B shows a case of changing scan directions, and FIG. 21C shows a case of changing the number of scan paths.

A contact target position designated with respect to the contour line 119 in the model image Im may be adjusted by moving a symbol 120 indicating the start position of a scan operation by mouse operation or the like. For example, by moving the symbol 120 in the radial direction of the contour line 119, the start position of the scan operation may be moved inward, away from the contour line 119. Also, by performing operation on the setting screen 100, the scan direction may be reversed, or a scan path may be added.

Figure 22A:
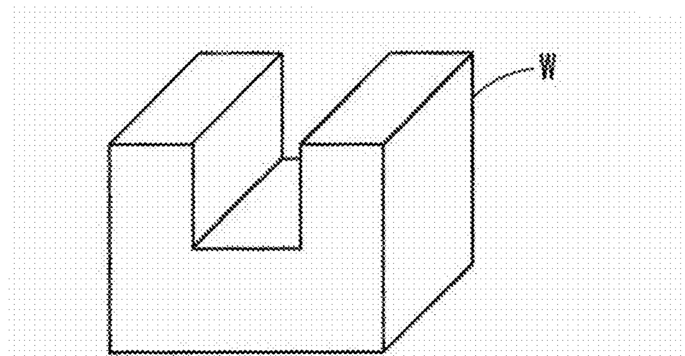
FIGS. 22A to 22C are diagrams showing an example of operation for a case where a start position of a scan operation interferes with another position.
Figure 22B:
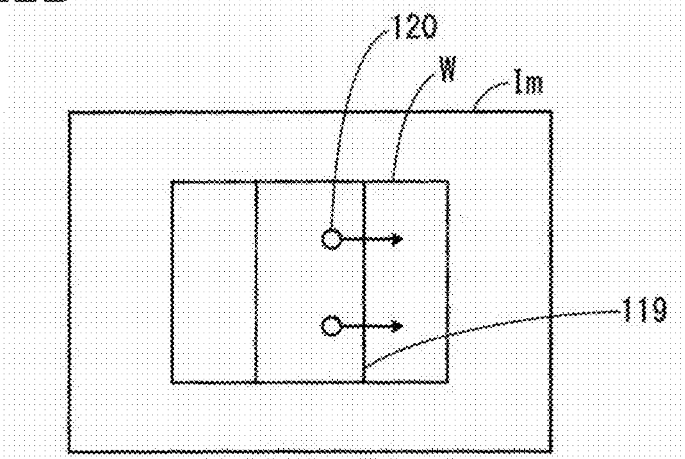
Figure 22C:
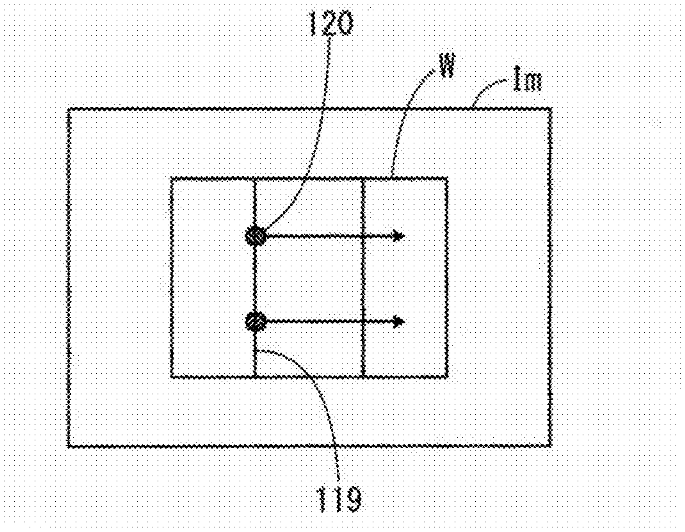

FIG. 22A shows a workpiece W which is a registration target, FIG. 22B shows contact target positions designated in the model image Im, and FIG. 22C shows symbols 120 which are displayed while being indicated as errors. Two scan paths are designated for a contour line 119 corresponding to a right side surface of the workpiece W. Contact target positions may be changed by moving the symbols 120 indicating the start positions of a scan operation by mouse operation or the like.

The measurement time may be reduced if the start position of a scan operation is close to the contour line 119 at the measurement position. However, if the start position of the scan operation is too close to the contour line 119 at the measurement position, the probe 26 may interfere with the workpiece W at the time of being moved to the start position, due to a variance in the dimensions of workpieces W. That is, in the case where the contour line 119 on the right side is taken as the measurement target, if the scan start position is too close to the contour line 119 on the right side, the probe 26 interferes with a workpiece W due to a variance in the dimensions of workpieces W at the time of successive measurement.

In the case where a contact target position designated in the model image Im is close to the contour line 119 of the measurement target, as in the case described above, the contact target position may be adjusted to be separated away from the contour line 119. That is, the start position of the scan operation may be adjusted to be separated away from the contour line 119 on the right side.

On the other hand, if the scan start position is too close to the contour line 119 on the left side, the probe 26 interferes with the left side surface of the workpiece W. If, as in this case, the scan start position is designated at a position overlapping a contour line 119 different from the contour line 119 as the measurement target, the symbol 120 is displayed while being indicated as an error. Accordingly, a user may check the model image Im, and may easily adjust the contact target position.

Figure 23A:
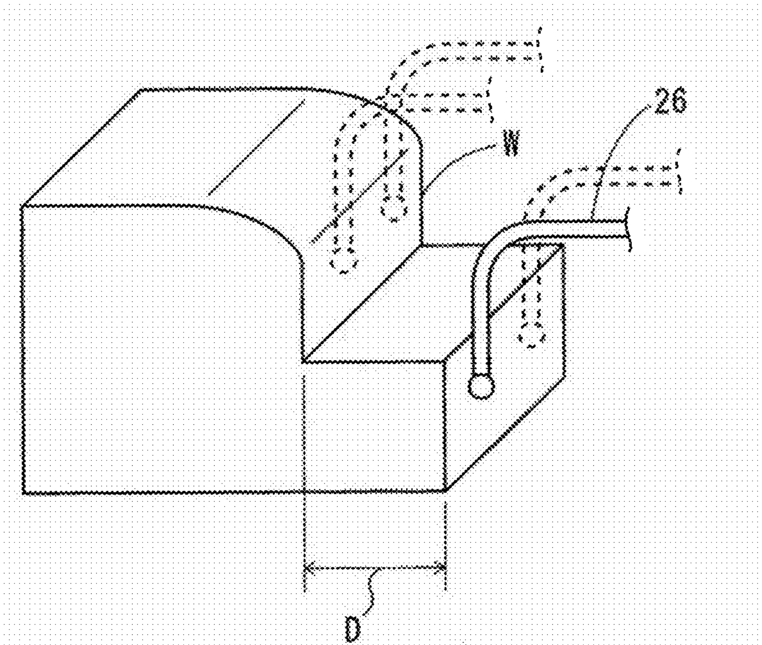
FIGS. 23A and 23B are diagrams showing an example of operation for a case of adjusting a height position of a scan operation on the model image.
Figure 23B:
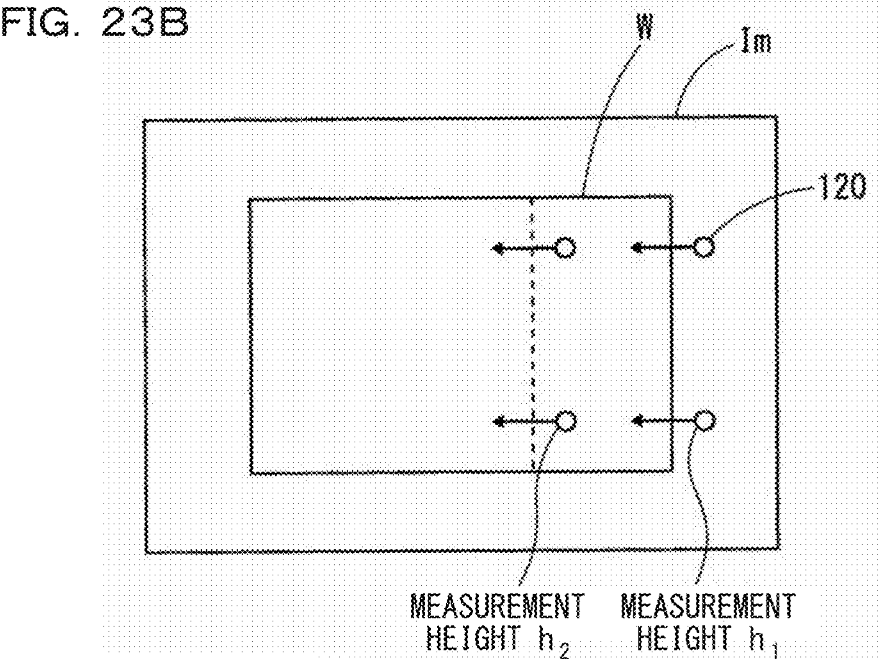

FIGS. 23A and 23B are diagrams showing an example of operation at the time of setting of a probe measurement element at the image measurement device 1 in FIG. 1. FIG. 23A shows a workpiece W which is a registration target, and FIG. 23B shows a case of adjusting a height position of a scan operation on the model image Im. The workpiece W includes steps in the height direction, and a distance D between a right side surface of a lower step and a right side surface of an upper step in the horizontal direction is measured using the probe 26.

The positions in the vertical direction of the right side surface of the lower step of the workpiece W and the right side surface of the upper step are different, and thus, the measurement height of the scan operation has to be appropriately designated. That is, a measurement height $h_2$ for measuring the right side surface of the upper step has to be designated at a position higher than a measurement height $h_1$ for measuring the right side surface of the lower step. Such height information may be designated by actually moving the probe 26, or by designating a numerical value.

Also, when the measurement height is changed, the probe 26 may be moved to the measurement height after change by controlling the vertical drive section 22, and the relationship between the workpiece W and the contact section 261 with respect to height may be actually checked.

Next, the controller 3 starts a scan operation, acquires a captured image of the probe 26 which is in contact with a side surface of a master piece, and identifies the position of a contact point based on the captured image (step S311). Then, the controller 3 determines the position of a contour line from the positions of two or more contact points (step S312).

The controller 3 calculates a dimension of a measurement position based on the position of the contour line, and displays a dimension value which is the measurement result on the model image in association with the measurement element (steps S313, S314). The controller repeats the processing procedure from steps S303 to S314 until setting is complete for all the measurement elements in the model image (step S315).

FIGS. 24A and 24B are diagrams showing examples of operation at the time of setting of a probe measurement element at the image measurement device 1 in FIG. 1. FIG. 24A shows a case of a first scan mode, and FIG. 24B shows a second scan mode. The first scan mode and the second scan mode are methods of movement of the probe 26 relatively moving between contact target positions with respect to the stage 23, and one of the first scan mode and the second scan mode may be designated.

In the first scan mode, the probe 26 is switched from the measurement height from the reference height each time the probe 26 is moved between contact target positions. In the case where there is an obstacle such as a step between two adjacent contact target positions, selecting the first scan mode reliably prevents interference with the workpiece W.

On the other hand, in the second scan mode, the probe 26 is relatively moved with respect to the stage 23, between contact target positions, without being switched to the reference height. Specifically, in the case where a plurality of contact target positions are designated for one measurement element, the probe 26 is relatively moved with respect to the stage 23, between the contact target positions, without being switched to the reference height. However, in the case of relatively moving the probe 26 with respect to the stage 23, between two different measurement elements, the probe 26 may be moved without being switched to the reference height, although the probe 26 is more desirably switched from the measurement height to the reference height. The measurement time may be reduced by moving the probe 26 at the same height with respect to the stage 23, along the contour line.

Figure 25:
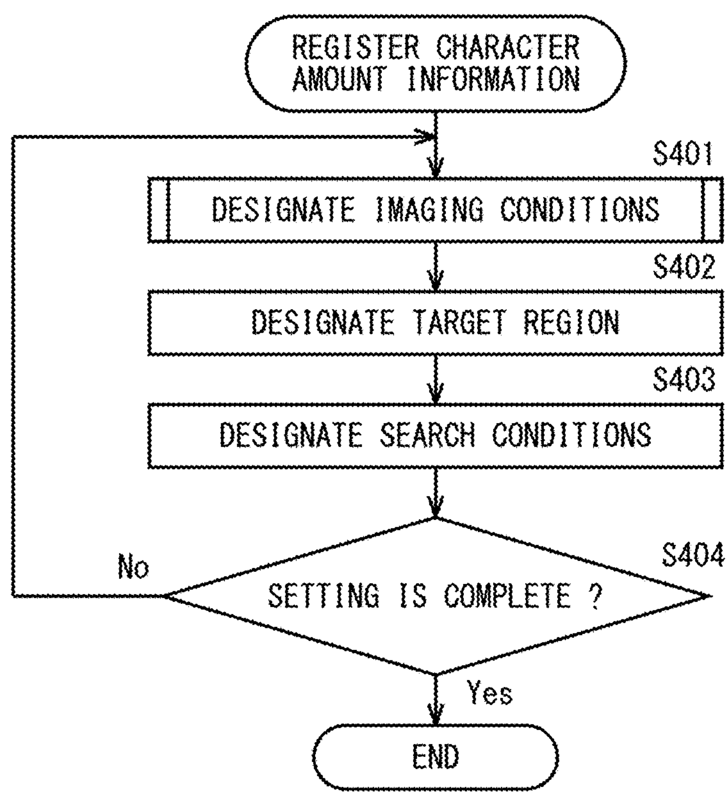
FIG. 25 is a flowchart showing an example of detailed operation of step S107 (registration of characteristic amount information) in FIG. 12.

FIG. 25 is a flowchart showing, in steps S401 to S404, an example of detailed operation of step S107 (registration of characteristic amount information) in FIG. 12, and shows an operation of the controller 3. First, after designating imaging conditions (step S401), the controller 3 acquires a model image of the master piece, and designates a registration target region (step S402).

Next, the controller 3 designates search conditions of pattern search that uses a pattern image (step S403). The controller 3 repeats the processing procedure from steps S401 to S403 until all the settings regarding registration of characteristic amount information are completed (step S404), and when all the settings are completed, a pattern image obtained from the model image and the search conditions are stored as characteristic amount information.

Figure 26:
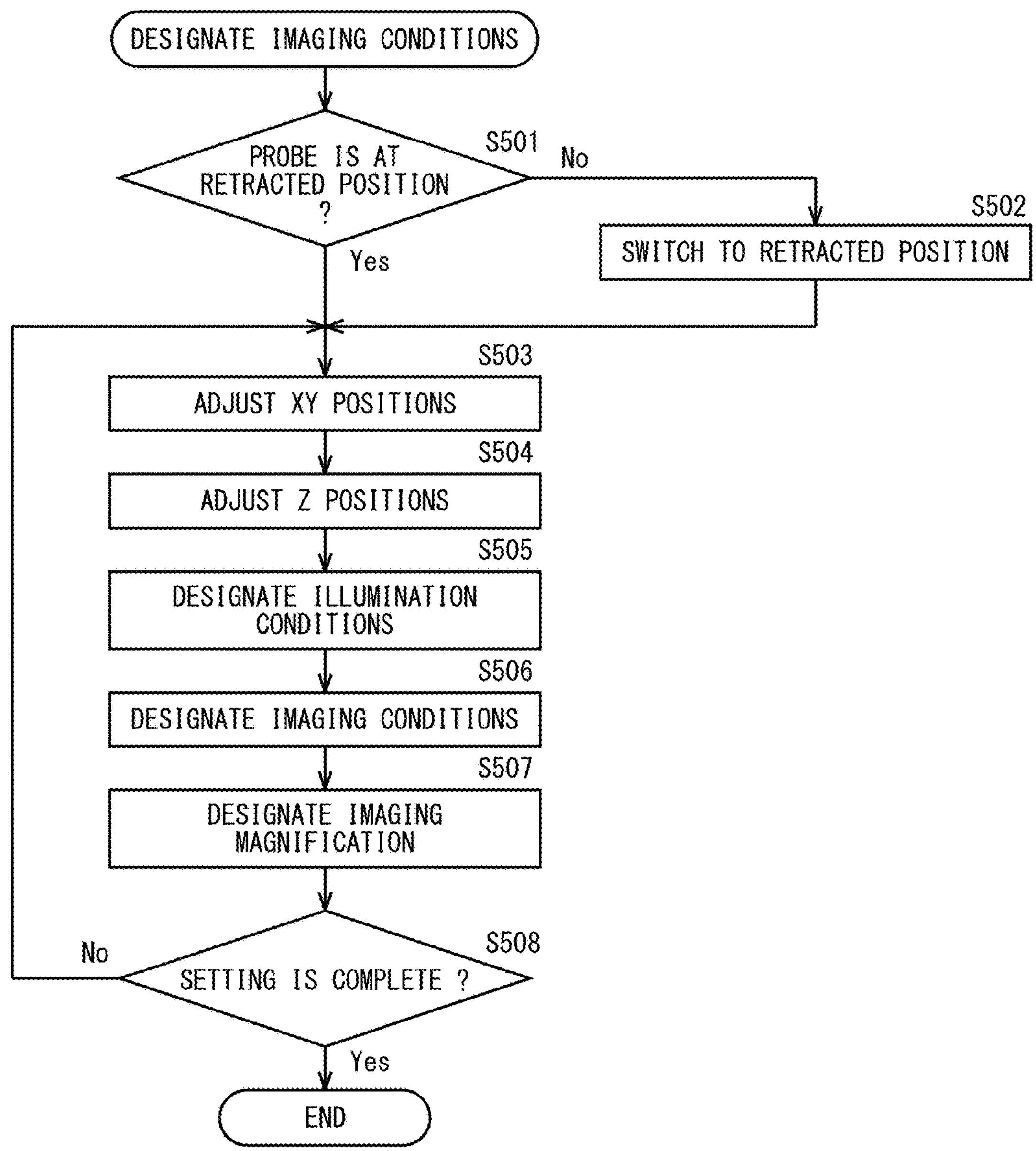
FIG. 26 is a flowchart showing an example of detailed operation of steps S201, S301 and S401 (designation of imaging conditions) in FIGS. 17, 19, and 25, respectively.

FIG. 26 is a flowchart showing, in steps S501 to S508, an example of detailed operation of steps S201, S301 and S401 (designation of imaging conditions) in FIGS. 17, 19, and 25, and shows an operation of the controller 3. First, the controller 3 checks the position of the probe 26, and if the position is not the retracted position, the controller 3 controls the switching drive section 27 of the measurement unit 20 to perform switching to the retracted position (steps S501, S502).

Next, the controller 3 controls the horizontal drive section 24, and adjust the positions of the stage 23 in the X direction and the Y direction on the horizontal plane (step S503). Next, the controller 3 controls the vertical drive section 22 and adjusts the position of the measurement unit 20 in the Z direction so as to adjust the focus position (step S504).

Then, the controller 3 designates the illumination conditions, the imaging conditions, and the imaging magnification (steps S505 to S507). The illumination conditions include the illumination type, the on/off state, the brightness, and the position of the ring illumination unit 211 in the Z direction. The imaging conditions include the exposure time, the gain, and the imaging range.

The controller 3 repeats the processing procedure from steps S503 to S507 until all the settings regarding designation of imaging conditions are completed (step S508), and when all the settings are completed, the imaging conditions are stored as measurement setting information.

Figure 27:
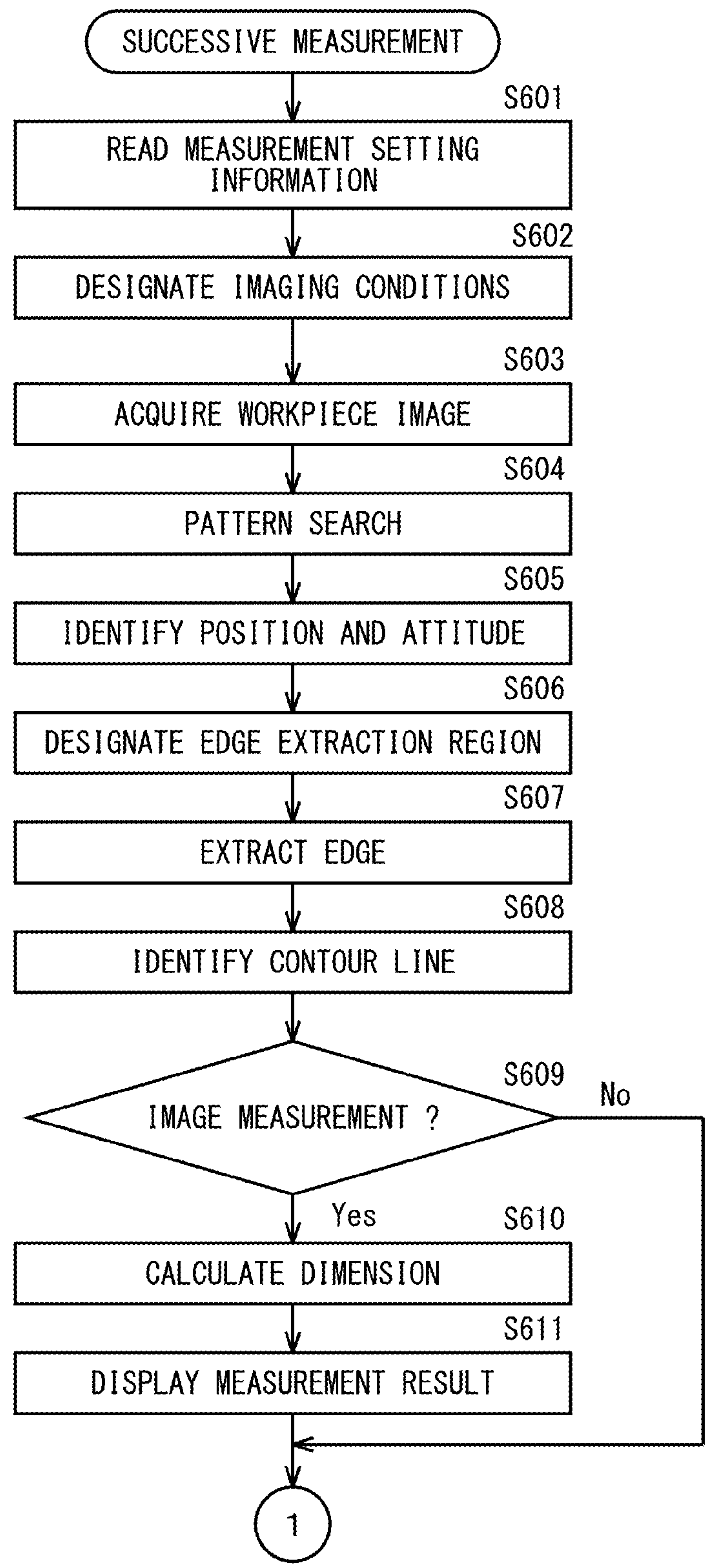
FIG. 27 is a flowchart showing an example of operation at the time of successive measurement at the controller in FIG. 5.
Figure 28:
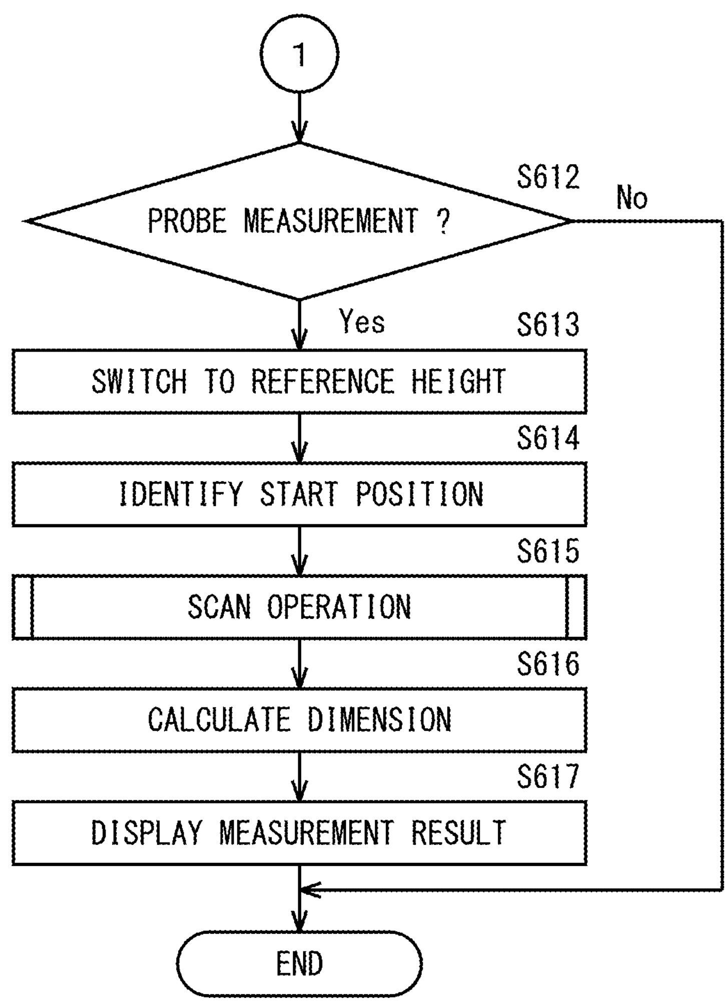
FIG. 28 is a flowchart showing an example of operation at the time of successive measurement at the controller in FIG. 5.

FIGS. 27 and 28 are flowcharts showing, in steps S601 to S617, an example of operation at the time of successive measurement at the controller 3 in FIG. 5. First, the controller 3 reads measurement setting information (step S601), and designates imaging conditions based on the measurement setting information (step S602). Next, the controller 3 captures an image of a workpiece W placed on the stage 23 under the imaging conditions and acquires a workpiece image (step S603), and identifies the position and the attitude of the workpiece W by pattern search using the characteristic amount information (steps S604, S605).

Next, the controller 3 identifies the position of an edge extraction region in the workpiece image based on the position and the attitude of the workpiece W which have been identified by pattern search (step S606). The controller 3 extracts a plurality of edge points from the identified edge extraction region (step S607), and identifies the position of a contour line by fitting a geometric figure with the edge points (step S608).

Next, if an image measurement element is registered as measurement setting information (step S609), the controller 3 calculates a dimension of a measurement position on the basis of the position of the identified contour line (step S610), and displays the dimension value, which is the measurement result, in the workpiece image in association with the measurement element (step S611).

Next, if a probe measurement element is registered as measurement setting information (step S612), the controller 3 switches the probe 26 from the retracted position to the measurement position by controlling the switching drive section 27 of the measurement unit 20, and then, switches the probe 26 to the reference height by controlling the vertical drive section 22 (step S613). The controller 3 identifies a scan start position based on the position of the contour line identified by extraction of an edge from the edge extraction region (step S614), and performs a scan operation (step S615).

Then, the controller 3 acquires captured images of the probe 26 which is in contact with a side surface of the workpiece W, identifies the position of a contour line by determining positions of contact points on the basis of the captured image, and calculates a dimension of the measurement position (step S616). Then, the controller 3 displays a dimension value, which is the measurement result, in the workpiece image in association with the measurement element (step S617).

Additionally, in the case where a contact target position is directly associated with the pattern image, the contact target position is directly identified from the position and the attitude of the workpiece W which have been identified by the pattern search. Also, if a contact target position is associated with the edge extraction region, the contact target position is identified by identifying the position of the edge extraction region in the workpiece image based on the position and the attitude of the workpiece W which have been identified by pattern search.

Figure 29A:
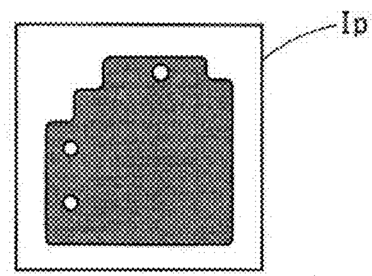
FIGS. 29A to 29D are diagrams showing examples of operation at the time of successive measurement at the image measurement device in FIG. 1.
Figure 29B:
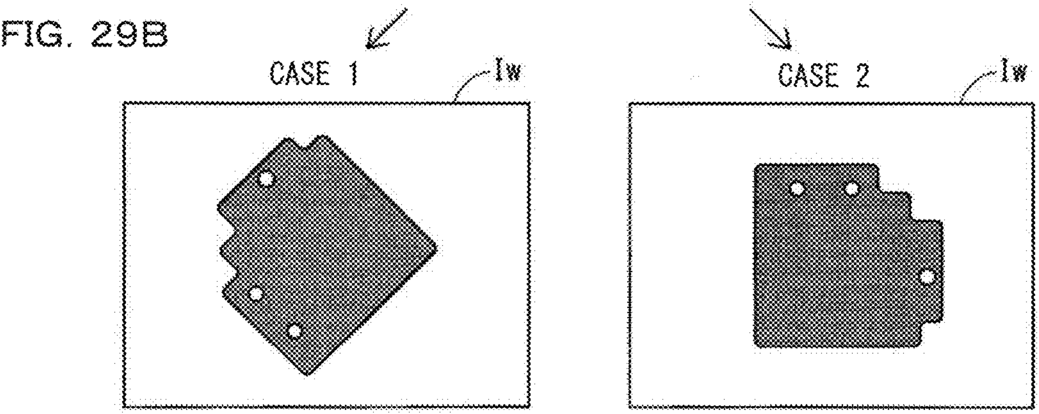

FIGS. 29A to 29D, FIGS. 30A to 30D, and FIG. 31 are diagrams showing examples of operation at the time of successive measurement at the image measurement device 1 in FIG. 1. In FIGS. 29B to 29D, FIGS. 30A to 30D, and FIG. 31, two workpiece images Iw showing a workpiece W at different positions and attitudes are shown as case 1 and case 2. FIG. 29A shows a pattern image Ip which is registered as search data, and FIG. 29B shows workpiece images Iw captured for pattern search. The pattern image Ip and the workpiece images Iw are all transmission images by transmitted illumination. The positions and the attitudes of the workpiece W are identified by matching the workpiece images Iw with the pattern image Ip.

Figure 29C:
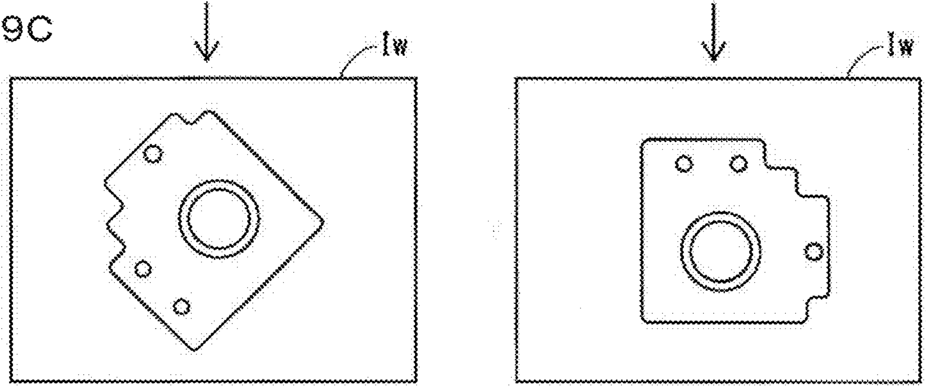

FIG. 29C shows workpiece images Iw which have been captured for edge extraction. The workpiece images Iw are reflection images by reflected illumination, and edge extraction regions are identified based on the positions and the attitudes of the workpiece W which have been identified by the pattern search.

Figure 29D:
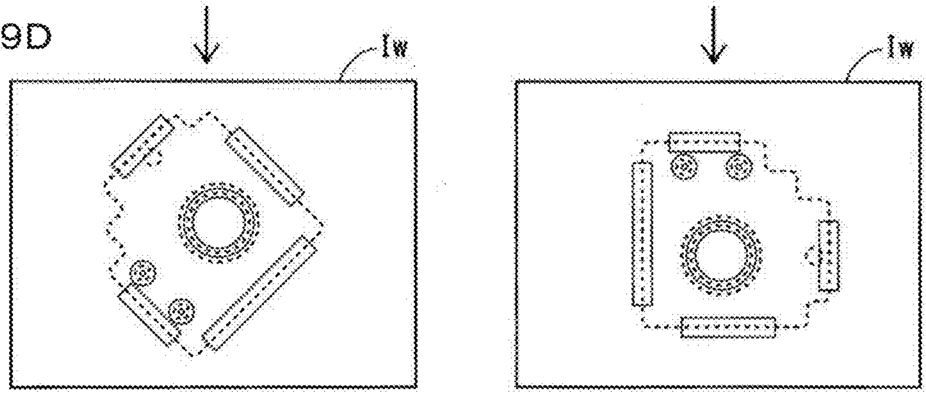

FIG. 29D show a plurality of edge extraction regions R which have been identified in the workpiece images Iw shown in FIG. 29C. Position coordinates of an edge extraction region R are identified based on the position and the attitude of the workpiece W and relative position information which is registered as edge extraction region information.

FIG. 30A shows a plurality of contour lines $L_1$ and $L_2$ which have been identified by extracting edges from the edge extraction regions R. The contour lines $L_1$ are contour lines for a case where the measurement element is registered as an image measurement element. On the other hand, the contour lines $L_2$ are temporary contour lines which are used to identify contact target positions in a case where the measurement element is registered as a probe measurement element, and the position accuracy is low.

FIG. 30B shows a plurality of contact target positions which have been identified with respect to the contour lines $L_2$ in the workpiece images Iw. A contact target position is identified based on the position of the contour line $L_2$ and the relative position information which is registered as contact target position information.

FIG. 30C shows a plurality of contact positions P which have been identified by contact of the probe 26. A contact position P is identified based on the workpiece image Iw which is acquired in a state where the probe 26 is in contact with a side surface of the workpiece W, and the position of the stage 23. FIG. 30D shows contour lines $L_3$ which have been identified by fitting geometric figures with the plurality of contact positions P.

Figure 31:
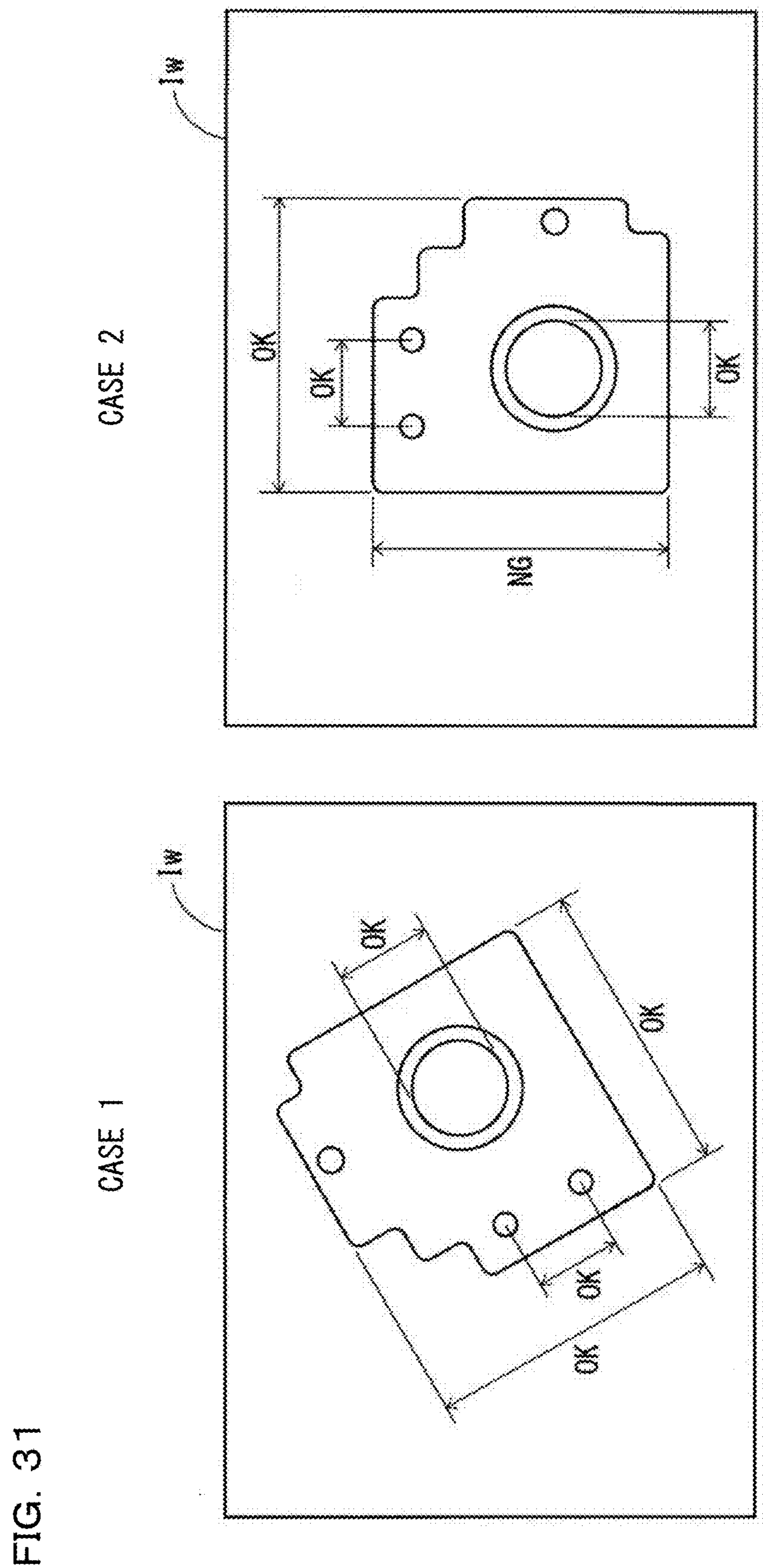
FIG. 31 is a diagram showing examples of operation at the time of successive measurement at the image measurement device in FIG. 1.

FIG. 31 shows workpiece images Iw where results of determination of quality of the workpiece W are displayed in association with measurement positions. The dimension value of a measurement position is determined based on the contour line $L_1$ identified by edge extraction or the contour line $L_3$ identified by probe operation. Also, the quality of the workpiece W is determined by comparing the determined dimension value against the design value, and by comparing an error from the design value against the tolerance. The result of determination of quality is displayed in the workpiece image Iw in association with the measurement position.

With the workpiece image Iw shown on the left side in FIG. 31, OK is determined for all the measurement positions, and the workpiece W is determined to be a non-defective product. On the other hand, with the workpiece image Iw shown on the right side in FIG. 31, NG is determined for one of the measurement positions registered as the image measurement elements, and the workpiece W is determined to be a defective product.

Figure 32:
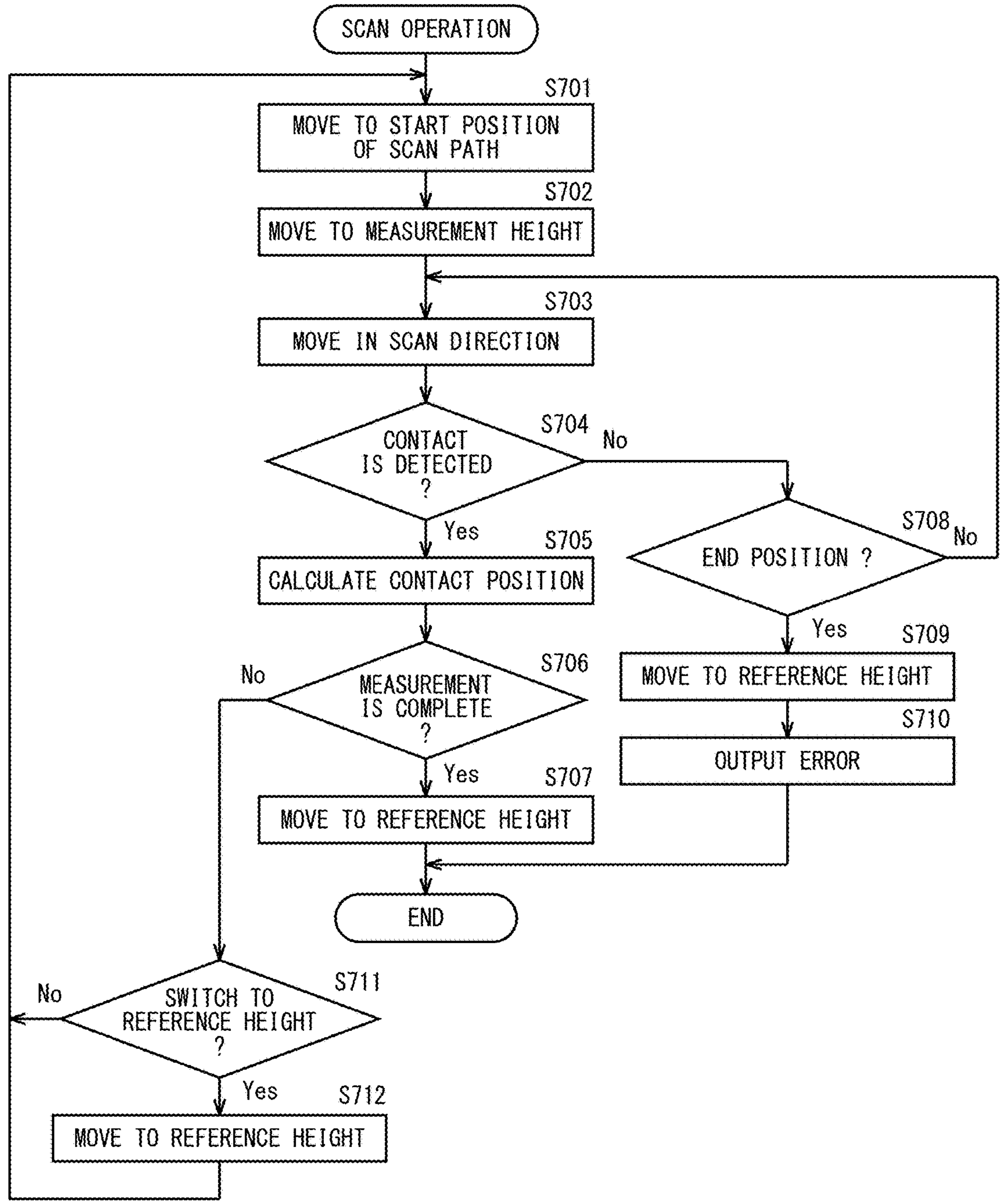
FIG. 32 is a flowchart showing an example of detailed operation of step S615 (scan operation) in FIG. 28.
Figure 33A:
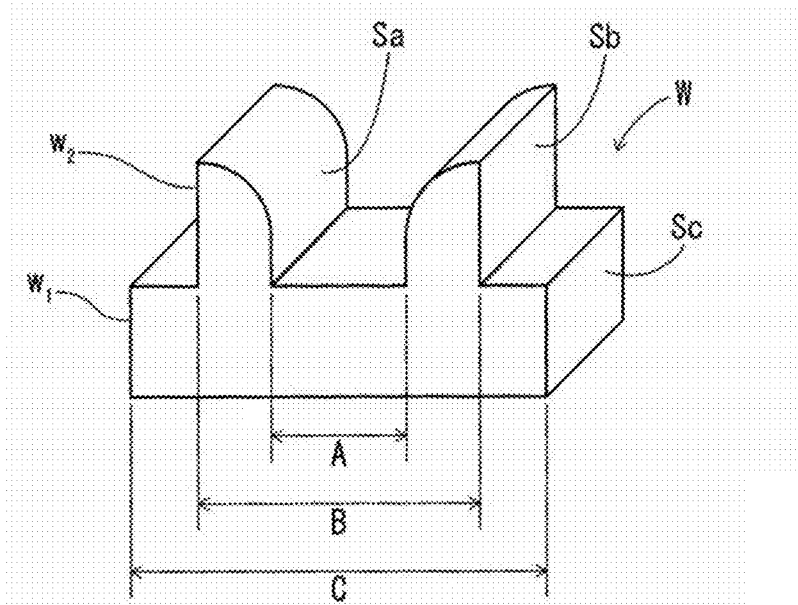
FIGS. 33A and 33B are diagrams showing an example of operation of a conventional image measurement device.
Figure 33B:
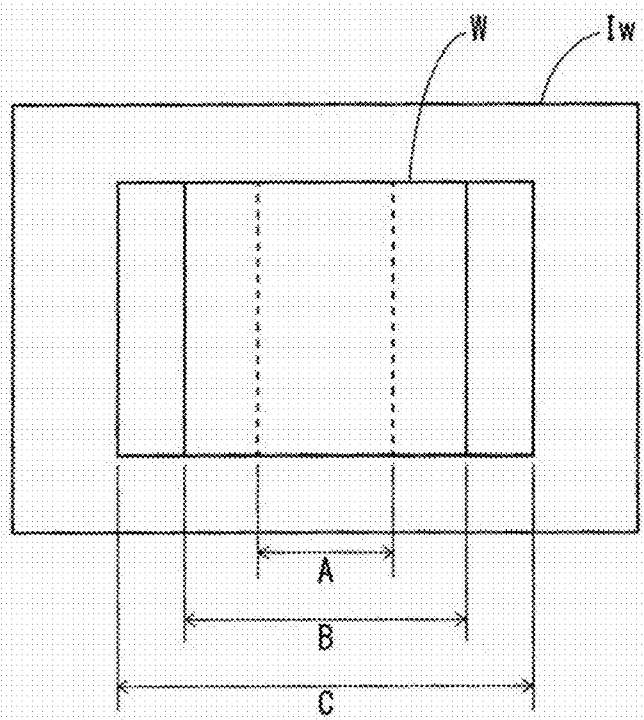

FIG. 32 is a flowchart showing, in steps S701 to S712, an example of detailed operation of step S615 (scan operation) in FIG. 28, and shows an operation of the controller 3. First, the controller 3 controls the horizontal drive section 24, and relatively moves the probe 26 with respect to the stage 23, at the reference height, to a position corresponding to the start position of a scan path (step S701), and then, controls the vertical drive section 22 and moves the probe 26 to the measurement height (step S702).

Next, the controller 3 controls the horizontal drive section 24, and relatively moves the probe 26 with respect to the stage 23 in the scan direction (step S703), and if contact is detected, the controller 3 calculates the contact position based on the position of the probe 26 in the workpiece image and the position of the stage 23 (steps S704, S705). The probe 26 is controlled to approach along the normal line of the contour line in the workpiece image. The controller 3 repeats the processing procedure from steps S701 to S705 until measurement is completed for all the contact target positions, and when measurement is completed for all the contact target positions, the controller 3 moves the probe 26 to the reference height, and ends the process (steps S706, S707).

If the first scan mode is designated, the controller 3 moves the probe 26 to the reference height each time the measurement is completed for a contact target position (steps S706, S711, S712).

Furthermore, if the probe 26 reaches the end position without contact being detected, the controller 3 determines that an error has occurred, and moves the probe to the reference height and outputs an error (steps S704, S708 to S710).

According to the present embodiment, because the position and the attitude of a workpiece W are identified from a workpiece image on the basis of a pattern image, dimension measurement using the probe 26 may be performed simply by placing the workpiece W on the stage 23. Also, because a contact target position where the probe 26 should contact is identified based on contact target position information, a plurality of contact target positions on the workpiece W may be identified and the probe 26 may be sequentially moved simply by designating first a position relative to the pattern image.

Moreover, because the workpiece image for identifying the position and the attitude of the workpiece W is generated in a state where the probe 26 is at the retracted position, the probe 26 may be prevented from being captured overlapping the workpiece W or from being captured near the workpiece W.

Also, according to the present embodiment, because a plurality of contact target positions on a side surface of a workpiece where the probe 26 should contact are identified based on the position of a measurement element, the shape type or the size of the measurement element, and the arrangement rule, the plurality of contact target positions may be automatically identified and a scan operation by the probe 26 may be determined simply by designating a measurement element in the model image.

Additionally, in the present embodiment, an example is described for a case where the horizontal drive section 24 moves the stage 23 in the X direction and the Y direction, but the present invention does not limit the horizontal drive section 24 to such a configuration. For example, the horizontal drive section 24 may be configured to move the probe 26 or the measurement unit 20 in the X direction and the Y direction. Alternatively, the horizontal drive section 24 may be configured to move the stage 23 in the X direction, and to move the probe 26 or the measurement unit 20 in the Y direction.

Also, in the present embodiment, an example is described for a case where the vertical drive section 22 moves the measurement unit 20 in the Z direction, but the present invention does not limit the vertical drive section 22 to such a configuration. For example, the vertical drive section 22 may be configured to move the stage 23 in the Z direction.

Furthermore, in the present embodiment, an example is described for a case where the scan direction of a scan path is designated based on the difference in brightness between both ends of an edge, but the present invention does not limit the designation method of the scan direction to such a method. For example, information about a height near a measurement position may be acquired by using the focus position of the imaging section 201 or 206, and the scan direction may be designated based on the height information. Also, a direction which is set in advance may be designated as a default scan direction.

Moreover, in the present embodiment, an example is described for a case where the measurement height of a contact target position is designated by a user, but the present invention may be configured such that the measurement height is automatically designated using the focus position of the imaging section 201 or 206.

Moreover, in the present embodiment, an example is described for a case where contact of the probe 26 with a side surface of a workpiece W is detected based on a workpiece image, but the present invention does not limit the method of contact detection to such a method. For example, contact of the probe 26 with a side surface of a workpiece W may be detected by using a sensor that detects pressure or vibration.

Moreover, in the present embodiment, an example is described for a case where the probe 26 is attached to a housing of the measurement unit 20, but the present invention may also be applied to a case where the probe 26 is capable of moving in the horizontal direction in a measurement region in the imaging field of view of the imaging section 201 or 206.

Moreover, in the present embodiment, a description is given on the image measurement device 1 which includes the light-emitting probe 26 where guide light is transmitted from the probe light source 263 through the metal tube 262, but the present invention does not limit the configuration of the probe 26 to such a configuration. For example, the probe does not have to emit guide light.

What is claimed is:

1. An image measurement device comprising:

a stage where a workpiece is to be placed;

a light projection section for radiating detection light on the workpiece on the stage;

an imaging section for receiving the detection light from the workpiece, and for generating a workpiece image;

a probe that is provided in a manner capable of being arranged in an imaging field of view of the imaging section;

a horizontal drive section for causing the probe to contact a side surface of the workpiece that is placed on the stage, by moving the stage and the probe relative to each other in a direction parallel to an upper surface of the stage;

a display section for displaying, at a time of measurement setting, a model image for setting that is generated based on design data of the workpiece or image data obtained by capturing an image of the workpiece by the imaging section;

an input receiving section for receiving designation of a measurement element for which measurement is to be performed by the probe, in the model image that is displayed by the display section;

a storage section storing, in advance, an arrangement rule defining a relationship between a shape type or a size of a measurement element that can be designated by the input receiving section and arranged positions of contact target positions of the probe; and a measurement control section for identifying, at a time of measurement execution, contact target positions of the probe, based on a position of the measurement element designated by the input receiving section, a shape type or a size of the measurement element, and the arrangement rule that is stored in the storage section, and for controlling the horizontal drive section so that the probe sequentially moves to the plurality of contact target positions identified.

2. The image measurement device according to claim 1, further comprising a display control section for displaying a symbol indicating a contact target position of the probe in the model image that is displayed by the display section, wherein the input receiving section receives a change in the contact target position based on a user operation.

3. The image measurement device according to claim 1, wherein the arrangement rule is determined such that, in a case where the shape type is a circle or an arc, three or more of the contact target positions are arranged at regular intervals in a circumferential direction of the circle or the arc.

4. The image measurement device according to claim 1, wherein the arrangement rule is determined such that, in a case where the shape type is a straight line, two or more of the contact target positions are arranged at regular intervals in a direction of the straight line.

5. The image measurement device according to claim 1, wherein the input receiving section receives setting of an edge extraction region on the measurement element, and the measurement control section extracts an edge from the edge extraction region that is set on the measurement element and identifies a contour line of the measurement element, identifies the plurality of contact target positions as positions on the contour line, and identifies a start position of a scan operation where the probe is to approach at a position that is separated from the contact target positions in a normal direction of the contour line.

6. The image measurement device according to claim 5, wherein the input receiving section receives a change in the number of the contact target positions on the contour line or in a scan direction of approach of the probe.

7. The image measurement device according to claim 5, wherein, in a case where the symbol overlaps the contour line, the display section displays an error.

8. The image measurement device according to claim 5, further comprising a vertical drive section for moving the stage and the probe relative to each other in an optical axis direction of the imaging section, wherein the input receiving section designates height information of a side surface of the workpiece where the probe should contact as a contact target position, the measurement control section controls the vertical drive section based on the height information, and adjusts a height of the probe relative to the stage, and the input receiving section further receives a change in the height information.

9. The image measurement device according to claim 8, wherein the input receiving section receives a user operation for designating one of a first scan mode and a second scan mode with mutually different movement methods for relatively moving the probe with respect to the stage, between contact target positions, the vertical drive section switches the height of the probe relative to the stage between a measurement height and a reference height that is higher than the measurement height, and the measurement control section controls the vertical drive section and switches the probe from the measurement height to the reference height at each time of movement between contact target positions, in a case where the first scan mode is designated, and causes the probe to relatively move with respect to the stage, between contact target positions, without being switched to the reference height, in a case where the second scan mode is designated.

10. The image measurement device according to claim 9, wherein, in a case where the second scan mode is designated, if a plurality of contact target positions are designated for one measurement element with which a geometric figure is to be fitted, the measurement control section causes the probe to relatively move with respect to the stage, between the contact target positions, without being switched to the reference height, and controls the vertical drive section and switches the probe from the measurement height to the reference height when causing the probe to relatively move with respect to the stage, between two different measurement elements.

11. The image measurement device according to claim 1, further comprising a contact detection section for detecting contact of the probe with a side surface of the workpiece, wherein, when contact is detected by the contact detection section, the measurement control section controls the imaging section and acquires workpiece images of the probe that is in contact with a side surface of the workpiece, identifies a plurality of contact positions where the probe contacted the workpiece, based on positions of the probe in the workpiece images and a relative position of the imaging field of view with respect to the stage, and determines a dimension of the workpiece based on the plurality of contact positions identified.

12. The image measurement device according to claim 1, wherein the storage section further stores characteristic amount information for identifying a position and an attitude of the workpiece from the workpiece image, and the measurement control section identifies the position and the attitude of the workpiece from the workpiece image based on the characteristic amount information, identifies the plurality of contact target positions on a side surface of the workpiece where the probe should contact, based on the identified position and the identified attitude of the workpiece, and controls the horizontal drive section so that the probe sequentially moves to the plurality of contact target positions identified.

13. The image measurement device according to claim 12, wherein the measurement control section identifies an edge extraction region based on the position and the attitude of the workpiece, in a case where the edge extraction region is designated on the measurement element, and determines a dimension of the workpiece based on a contour line identified by extracting an edge from the edge extraction region identified and a contour line identified by contact of the probe.

14. The image measurement device according to claim 13, further comprising a switching drive section for switching between a state where the probe is positioned at a measurement position in the imaging field of view and a state where the probe is positioned at a retracted position that is reached by the probe moving in a direction away from a center of the imaging field of view, wherein the measurement control section identifies the edge extraction region from the workpiece image generated in a state where the probe is at the retracted position, and performs edge extraction.

15. The image measurement device according to claim 1, wherein, in a case where an edge extraction region is designated on the measurement element, the measurement control section determines a scan direction for when the probe is to approach a side surface of the workpiece, based on a difference in brightness between both ends of an edge that is extracted from the edge extraction region.

* * * * *